United States Patent
Kawase

(10) Patent No.: US 12,223,758 B2
(45) Date of Patent: Feb. 11, 2025

(54) INFORMATION PROCESSING APPARATUS, INFORMATION PROCESSING METHOD, AND NON-TRANSITORY COMPUTER-READABLE STORAGE MEDIUM

(71) Applicant: NEC Corporation, Tokyo (JP)

(72) Inventor: Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/225,610

(22) Filed: Jul. 24, 2023

(65) Prior Publication Data
US 2023/0368561 A1 Nov. 16, 2023

Related U.S. Application Data

(63) Continuation of application No. 17/298,101, filed as application No. PCT/JP2018/045054 on Dec. 7, 2018, now Pat. No. 11,847,848.

(51) Int. Cl.
G06V 40/10 (2022.01)
G06V 10/25 (2022.01)
(Continued)

(52) U.S. Cl.
CPC .............. *G06V 40/10* (2022.01); *G06V 10/25* (2022.01); *G06V 20/52* (2022.01); *G06V 20/53* (2022.01); *G06V 40/171* (2022.01); *G06V 40/172* (2022.01)

(58) Field of Classification Search
CPC ...... G06F 18/22; G06V 10/75; G06V 40/168; G06V 40/172; G06V 10/25; G06V 20/52; G06V 20/53; G06V 40/10; G06V 40/171
See application file for complete search history.

(56) References Cited

U.S. PATENT DOCUMENTS 6,698,653 B1 3/2004 Diamond et al.
2003/0039380 A1 2/2003 Sukegawa et al.
(Continued)

FOREIGN PATENT DOCUMENTS

JP H11175730 A 7/1999
JP 2008108243 A 5/2008
(Continued)

OTHER PUBLICATIONS

International Search Report of PCT Application No. PCT/JP2018/045054 mailed Mar. 12, 2019.
(Continued)

*Primary Examiner* — Ruiping Li

(57) ABSTRACT

An information processing apparatus (100) includes a collation unit (102) that collates first feature information extracted from a person included in a first image (20) with first registered feature information stored in a storage unit (110), and a registration unit (104) that stores, in a case where the first feature information is unable to be extracted from the person or a collation result in the collation unit (102) indicates a mismatch, second feature information extracted from the person in the storage unit (110) as second registered feature information, in which the collation unit (102) collates second feature information extracted from a person included in a second image (22) with the second registered feature information stored in the storage unit (110), and thus specifies the person corresponding to the second registered feature information in the second image (22).

17 Claims, 18 Drawing Sheets

(51) Int. Cl.
*G06V 20/52* (2022.01)
*G06V 40/16* (2022.01)

(56) References Cited

U.S. PATENT DOCUMENTS

| | | | |
|---|---|---|---|
| 2006/0120564 A1 | 6/2006 | Imagawa et al. | |
| 2011/0311112 A1 | 12/2011 | Matsuyama et al. | |
| 2013/0070973 A1 | 3/2013 | Saito et al. | |
| 2014/0133713 A1* | 5/2014 | Kim | G06V 40/172 |
| | | | 382/118 |
| 2015/0339516 A1 | 11/2015 | Yano | G06T 7/74 |
| | | | 382/118 |
| 2017/0070501 A1 | 3/2017 | Saito et al. | |
| 2017/0351906 A1 | 12/2017 | Oguchi et al. | |
| 2018/0181797 A1 | 6/2018 | Han | G06V 10/764 |
| 2018/0276487 A1 | 9/2018 | Syu | G06V 40/50 |
| 2020/0089850 A1 | 3/2020 | Wan | |
| 2020/0143149 A1 | 5/2020 | Han et al. | |

FOREIGN PATENT DOCUMENTS

| | | |
|---|---|---|
| JP | 2009-048347 A | 3/2009 |
| JP | 2009104526 A | 5/2009 |
| JP | 2010171550 A | 8/2010 |
| JP | 2010-219607 A | 9/2010 |
| JP | 2013065119 A | 4/2013 |
| JP | 2013101551 A | 5/2013 |
| JP | 2016046639 A | 4/2016 |
| JP | 2016-127563 A | 7/2016 |
| JP | 2018077552 A | 5/2018 |
| WO | 2006013765 A1 | 2/2006 |

OTHER PUBLICATIONS

Extended European Search Report for EP Application No. 18942078.9 dated on Nov. 15, 2021.

Japanese Office Action for JP Application No. 2020-558776, mailed on Nov. 15, 2022 with English Translation.

US Office Action for U.S. Appl. No. 18/225,513, mailed on Mar. 13, 2024.

US Office Action for U.S. Appl. No. 18/226,174, mailed on Jul. 25, 2024.

US Office Action for U.S. Appl. No. 18/225,616, mailed on Jul. 18, 2024.

* cited by examiner

| PERSON DETECTION | DATE AND TIME |
|---|---|
| C | 2019/09/28 09:10:14 |
| ⋮ | ⋮ |

| PERSON DETECTION | DATE AND TIME |
|---|---|
| C | 2019/09/28 09:10:14 |
| D | 2019/09/28 09:18:10 |
| ⋮ | ⋮ |

| PERSON DETECTION | DATE AND TIME |
|---|---|
| C | 2019/09/28 09:10:14 |
| ⋮ | ⋮ |

| PERSON DETECTION | DATE AND TIME | FACE DETECTION | DATE AND TIME |
|---|---|---|---|
| A | 2019/09/28 09:00:45 | COMPLETED | 2019/09/28 09:01:30 |
| B | 2019/09/28 09:04:55 | COMPLETED | 2019/09/28 09:05:15 |
| C | 2019/09/28 09:10:14 | UNCOMPLETED | |
| ⋮ | ⋮ | ⋮ | ⋮ |

| PERSON DETECTION | DATE AND TIME | FACE DETECTION | DATE AND TIME |
|---|---|---|---|
| A | 2019/09/28 09:00:45 | COMPLETED | 2019/09/28 09:01:30 |
| B | 2019/09/28 09:04:55 | COMPLETED | 2019/09/28 09:05:15 |
| C | 2019/09/28 09:10:14 | UNCOMPLETED | |
| D | 2019/09/28 09:18:10 | UNCOMPLETED | |
| ⋮ | ⋮ | ⋮ | ⋮ |

| PERSON DETECTION | DATE AND TIME | FACE DETECTION | DATE AND TIME |
|---|---|---|---|
| A | 2019/09/28 09:00:45 | COMPLETED | 2019/09/28 09:01:30 |
| B | 2019/09/28 09:04:55 | COMPLETED | 2019/09/28 09:05:15 |
| C | 2019/09/28 09:10:14 | UNCOMPLETED | |
| D | 2019/09/28 09:18:10 | COMPLETED | 2019/09/28 09:23:30 |
| ⋮ | ⋮ | ⋮ | ⋮ |

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

The present application is a continuation application of U.S. patent application Ser. No. 17/298,101 filed on May 28, 2021, which is a National Stage Entry of international application PCT/JP2018/045054 filed on Dec. 7, 2018, the disclosures of all of which are incorporated in their entirety by reference herein.

TECHNICAL FIELD

This disclosure relates to an information processing system, an information processing apparatus, an information processing method, and a program, and particularly to an information processing system, an information processing apparatus, an information processing method, and a program, capable of performing an image recognition process.

BACKGROUND ART

Patent Document 1 discloses an example of a walkthrough type face image authentication apparatus. The face image authentication apparatus disclosed in Patent Document 1 specifies an authentication candidate person from a plurality of faces (appearing persons) included in a plurality of facial region images captured at different time points, and determines an authentication threshold value by using an index indicating a height of a similarity degree between the authentication candidate person and a face image. The index used here is (a first place hit ratio which is a ratio of a frame in which the similarity degree is highest). As the first place hit ratio becomes higher, the authentication threshold value is reduced. Even in a case where there is a frame in which the similarity degree with respect to another person is temporarily high due to a change of an expression or a direction of a face, when the first place hit ratio is low, the authentication threshold value is not reduced.

A person recognition apparatus disclosed in Patent Document 2 detects a face of a passerby from each of a first image captured by a first camera and a second image captured by a second camera. Here, the first camera is provided in a state of being easily recognized by a passerby, and the second camera is provided in a state of being hardly recognized by a passerby.

The passerby is classified on the basis of detection results in both of the images, an authentication threshold value used for a face collation process is adjusted on the basis of a classification result, and an output process content based on an authentication result is determined.

A person judgment apparatus and a person retrieval tracking apparatus disclosed in Patent Document 3 detect a walking state of a person from temporally-distant frames or person image sequences obtained by different cameras, and judges whether or not persons included in different image sequences are the same person on the basis of the walking state. Consequently, a person can be tracked. Patent Document 4 discloses a technique in which a stride, a height, a weight, or a walking state (a stride or a pace) of an authentication target person is detected, and personal authentication is performed through collation with authentication information. Patent Document 5 discloses a gate management system which performs an authentication process on the basis of a gait (a stride, a posture, a way to swing arms, or the like) of a person passing through a gate, and controls locking and unlocking of the gate.

RELATED DOCUMENTS

Patent Documents

[Patent Document 1] Japanese Patent Application Publication No. 2013-101551
[Patent Document 2] Japanese Patent Application Publication No. 2008-108243
[Patent Document 3] International Publication No. WO2006/013765
[Patent Document 4] Japanese Patent Application Publication No. 2009-104526
[Patent Document 5] Japanese Patent Application Publication No. 2018-77552

SUMMARY OF THE INVENTION

Technical Problem

The present inventor has examined a new technique for tracking a person by using image processing. In other words, an object of this disclosure is to provide a new technique for tracking a person by using image processing.

Solution to Problem

In each aspect of this disclosure, the following configuration is employed to solve the above-described problem.

A first aspect relates to an information processing apparatus.

A first information processing apparatus related to the first aspect includes a collation unit that collates first feature information extracted from a person included in a first image with first registered feature information stored in a storage unit; and a registration unit that, in a case where the first feature information is unable to be extracted from the person or a collation result in the collation unit indicates a mismatch, stores second feature information extracted from the person in the storage unit as second registered feature information, in which the collation unit collates second feature information extracted from a person included in a second image with the second registered feature information stored in the storage unit, and thus specifies the person corresponding to the second registered feature information in the second image.

A second information processing apparatus related to the first aspect includes a collation unit that collates first feature information extracted from a person included in a first image with first registered feature information stored in a storage unit; and a registration unit that stores second feature information extracted from the person in the storage unit as second registered feature information, in which the collation unit collates second feature information extracted from a person included in a second image with the second registered feature information stored in the storage unit, and thus specifies the person corresponding to the second registered feature information in the second image, and in which, in a case where the first feature information is unable to be extracted from the person included in the first image, or a collation result between the first feature information extracted from the person included in the first image and the first registered feature information indicates a mismatch, the collation unit collates first feature information extracted from the person specified in the second image with the first registered feature information stored in the storage unit.

A second aspect relates to an information processing method executed by at least one computer.

A first information processing method executed by an information processing apparatus, related to the second aspect, includes: collating first feature information extracted from a person included in a first image with first registered feature information stored in a storage unit; storing, in a case where the first feature information is unable to be extracted from the person or a collation result in the collation unit indicates a mismatch, second feature information extracted from the person in the storage unit as second registered feature information; and collating second feature information extracted from a person included in a second image with the second registered feature information stored in the storage unit, and thus specifying the person corresponding to the second registered feature information in the second image.

A second information processing method executed by an information processing apparatus, related to the second aspect, includes: collating first feature information extracted from a person included in a first image with first registered feature information stored in a storage unit; storing second feature information extracted from the person in the storage unit as second registered feature information; collating second feature information extracted from a person included in a second image with the second registered feature information stored in the storage unit, and thus specifying a person corresponding to the second registered feature information in the second image; and collating, in a case where the first feature information is unable to be extracted from the person included in the first image, or a collation result between the first feature information extracted from the person included in the first image and the first registered feature information indicates a mismatch, the first feature information extracted from the person specified in the second image with the first registered feature information stored in the storage unit.

It should be noted that other aspects of this disclosure may relate to a program causing at least one computer to execute the method of the second aspect described above, and may relate to a computer readable storage medium storing such a program. The storage medium includes a non-transitory medium.

The computer program includes computer program codes causing a computer to execute the information processing method on the information processing apparatus when the program is executed by the computer.

It should be noted that any combination of the above-described constituent elements, and expressional conversion of this disclosure among a method, an apparatus, a system, a storage medium, a computer program, and the like are also effective as an aspect of this disclosure.

Various constituent elements of this disclosure are not necessarily required to be individually independent elements. For example, a plurality of constituent elements may be configured as a single member, a single constituent element may be configured with a plurality of members, any constituent element may be a part of another constituent element, and a part of any constituent element may overlap a part of another constituent element.

A plurality of procedures are sequentially described in the method and the computer program of this disclosure, but the order of description does not limit an order of executing the plurality of procedures. Thus, in a case where the method and the computer program of this disclosure are executed, the order of the plurality of procedures may be changed within the scope without contradiction to contents thereof.

The plurality of procedures of the method and the computer program of this disclosure are not limited to being individually executed at different timings. Thus, another procedure may occur during execution of any procedure, and an execution timing of any procedure may partially or entirely overlap an execution timing of another procedure.

Advantageous Effects of Invention

According to the respective aspects, it is possible to provide a new technique for detecting a person to whom attention is required to be paid by using image processing.

BRIEF DESCRIPTION OF THE DRAWINGS

The above-described object, and other objects, features, and advantages will become apparent throughout preferable example embodiments described below and the accompanying drawings.

FIGS. 15A to 15C are diagrams illustrating a change in data registered in a second storage unit of a storage unit of an Example.

FIGS. 16A to 16C are diagrams each illustrating examples of other data structures of the second storage unit of the storage unit of the Example.

FIGS. 18A to 18C are diagrams illustrating a change in data registered in the second storage unit of the storage unit of the Example.

DESCRIPTION OF EMBODIMENTS

Figure 1:
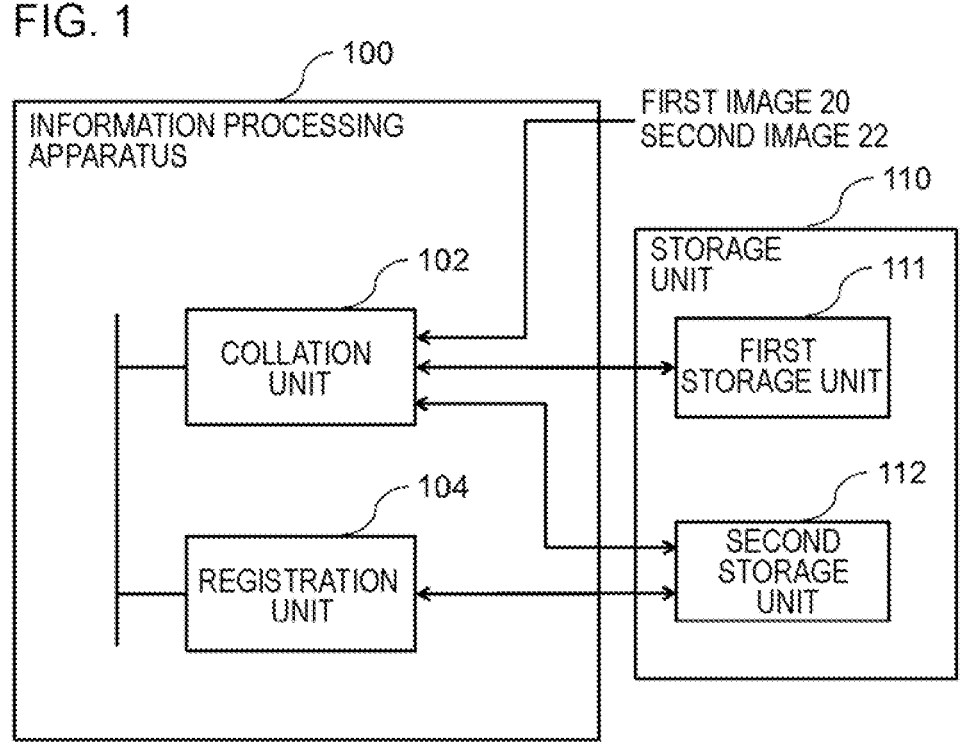
FIG. 1 is a functional block diagram illustrating a logical configuration of an information processing apparatus according to a first example embodiment of this disclosure.

Hereinafter, example embodiments of this disclosure will be described with reference to the drawings. The same constituent elements are given the same reference numerals throughout all the drawings, and description thereof will not be repeated as appropriate.

In each drawing of the present specification, a configuration of a portion having no relation to the essence of this disclosure is omitted and is not illustrated.

First Example Embodiment

FIG. 1 is a functional block diagram illustrating a logical configuration of an information processing apparatus 100 according to an example embodiment of this disclosure. The information processing apparatus 100 tracks a person who is not authenticated on the basis of a captured image in a predetermined area.

The information processing apparatus 100 includes a collation unit 102 and a registration unit 104. In the example illustrated in the present figure, the information processing apparatus 100 further includes a storage unit 110. The storage unit 110 includes a first storage unit 111 (for example, a face feature information database) and a second storage unit 112. The storage unit 110 may be constituted by a plurality of physical storage media or a plurality of databases. The first storage unit 111 and the second storage unit 112 may be included in a physically identical apparatus, and may be included in physically different apparatuses. The first storage unit 111 and the second storage unit 112 may be provided integrally with a main body of the information processing apparatus 100, and may be provided separately therefrom.

The collation unit 102 collates first feature information extracted from a person included in a first image 20 with first registered feature information stored in the storage unit 110.

In a case where the first feature information cannot be extracted from a person, or a collation result in the collation unit 102 indicates a mismatch, the registration unit 104 stores second feature information extracted from the person in the storage unit 110 as second registered feature information. In other words, the registration unit 104 registers the second feature information of the person in the storage unit 110.

The collation unit 102 collates second feature information extracted from a person included in a second image 22 with the second registered feature information stored in the storage unit 110, and thus specifies a person corresponding to the second registered feature information in the second image 22. Hereinafter, a collation process using the first registered feature information will be referred to as an "individual identification process" in some cases, and a collation process using the second registered feature information will be referred to as a "person specification process" in some cases.

The first feature information is feature information enabling a person to be specified, and is face feature information in the present example embodiment, and will be hereinafter referred to as face feature information in some cases. The first registered feature information stored in the first storage unit 111 will also be hereinafter referred to as face registered feature information in some cases. The first feature information may be other biological information, for example, an iris, a pinna, a vein, a fingerprint, and a gait. The first storage unit 111 may store a plurality of types of biological information for a single person. In this case, the collation unit 102 may perform a collation process in combination of the plurality of types of biological information.

The second feature information is feature information of a person including regions other than the face, and will be hereinafter referred to as "person region feature information" in some cases. The second registered feature information registered in the second storage unit 112 will be hereinafter referred to as registered person region feature information in some cases. The person region feature information is feature information indicating an appearance feature such as a size or clothes of a person of which the face cannot be authenticated by the collation unit 102. The person region feature information includes information indicating features such as a height, a shoulder width, a body part ratio, a garment (a shape, a color, a material, or the like), a hair style (also including a hair color), an ornament (a cap, spectacles, an accessory, or the like), and a belonging (a bag, an umbrella, or a stick). The person region feature information may include information such as likelihood of the feature information.

Hereinafter, the information processing apparatus 100 will be described in detail.

First, a description will be made of an image processed by the information processing apparatus 100. The first image 20 and the second image 22 may be captured by an identical imaging unit, and may be captured by different imaging units. The imaging unit is a camera including a lens and an imaging element such as a charge coupled device (CCD) image sensor, and is preferably a network camera such as an Internet Protocol (IP) camera. The network camera has, for example, a wireless local area network (LAN) communication function, and is connected to the information processing apparatus 100 through a communication network, that is, a relay apparatus (not illustrated) such as a router. The camera may be a so-called surveillance camera. The imaging unit may include a mechanism which tracks movement of a specific person in accordance with the movement, and performs control of a camera main body or a direction of a lens, zoom control, or focusing.

The camera and the information processing apparatus 100 may be directly connected to each other, and may be indirectly connected to each other through a communication network or the like as described above. For example, image data captured by the camera may be directly transmitted to the information processing apparatus 100, and the information processing apparatus 100 may sequentially receive the image data. A storage unit (not illustrated) which can be accessed by both of the camera and the information processing apparatus 100 may be provided. In this case, image data captured by the camera may be stored in the storage unit, and the information processing apparatus 100 may read and acquire the image data from the storage unit.

Here, the image data may be at least one of a still image and a moving image. A data format, a file format, a file size, an image size, a resolution of an image, a frame rate of moving images, and the like are not particularly limited, and data of various formats may be employed according to specifications, standards, performance, and the like of the camera and the information processing apparatus 100, or image analysis processing performance or accuracy thereof. At least one frame of the image data is at least one of the first image 20 and the second image 22.

In the example embodiment, the "acquisition" includes at least one of an apparatus fetching (active acquisition) data or information stored in another apparatus or a storage medium and the apparatus receiving (passive acquisition) data or information which is output from another apparatus. As an example of the active acquisition, there are a case where an apparatus sends a request or an inquiry to another apparatus, and receives a response thereto, and a case where the apparatus accesses another apparatus or a storage medium, and reads data or information. As an example of the passive acquisition, there is a case where an apparatus receives delivered information (alternatively, transmitted information or information sent through push notification). The "acquisition" may include selectively acquiring data or information from received data or information, or selectively receiving delivered data or information.

Regarding a timing at which an image is transmitted from the camera to the information processing apparatus 100, an image may be delivered in real time, for example, through streaming delivery, and images corresponding to a predetermined period may be transmitted at a predetermined interval. The timing may be selected as appropriate on the basis of a memory capacity, a communication capacity, or image processing performance of the camera or the information processing apparatus 100, or a communication situation or the like between the camera and the information processing apparatus 100, and may be changed depending on a situation change.

In the present example embodiment, the first image 20 is captured at a first timing, and the second image 22 is captured after the first timing.

The phrase "after the first timing" indicates either one of a timing after a predetermined time elapses from the first timing and a predetermined time point later than the first timing. The second image 22 captured "after the first timing" may be a plurality of images captured at different timings. In this case, an individual identification process and a person specification process in the collation unit 102 are sequentially performed on each image. In other words, processes of performing an individual identification process on the second image 22 having undergone a person specification process as the first image 20 at the next timing, and of performing a person specification process on the second image 22 captured at the further next timing, may be repeatedly performed.

As described above, the first storage unit 111 of the information processing apparatus 100 stores the face feature information of an individual who is an authentication target. For example, it is assumed that face feature information of an employee is stored in the first storage unit 111. In this case, in a case where face feature information matching face feature information detected from a captured image is not stored in the first storage unit 111, a person with the face may be estimated to be a person who is not an employee. It should be noted that a matching method in a collation process may employ various methods, and is not limited to a specific method.

For example, an individual identification process in the collation unit 102 may be performed according to any of the following procedures, but is not limited thereto.

(a1) A person region is first detected, and a facial region in the detected person region is specified. Authentication is performed on the specified facial region.

(a2) A facial region is first detected, and authentication is performed on the detected facial region. A person region including the facial region is specified. In this case, in a case where authentication is possible, specification of a person region may be omitted.

(a3) A person region and a facial region are detected, and authentication is performed on the detected facial region.

In addition to a case where there is no matching face feature information in an individual identification process, the registration unit 104 may store person region feature information based on a person region on which a collation process cannot be performed, in the second storage unit 112 in a case where a facial region cannot be determined from a process included in the first image 20. For example, even in a case where a suspicious person recognizes a position of a surveillance camera, and face feature information cannot be acquired as a result of the person having acted by avoiding the camera, person region feature information is stored in the second storage unit 112.

A collation result in the collation unit 102 includes either one of information indicating that the first feature information (face feature information) or the second feature information (person region feature information) matches stored feature information and information indicating that the first feature information or the second feature information does not match (mismatches) the stored feature information. The information indicating a mismatch with face feature information may include a case where face feature information cannot be extracted from a person included in the first image 20.

Figure 2:
FIG. 2 is a diagram illustrating an example of a data structure of a second storage unit of a storage unit in FIG. 1.

FIG. 2 is a diagram illustrating an example of a data structure of the second storage unit 112.

In the second storage unit 112, date-and-time information and person region feature information are stored in association with each other. The date-and-time information is at least one of a capturing time point of the first image 20, an acquisition time point of the first image 20, an execution time point of a face authentication process based on the first image 20, an acquisition time point of a result of the face authentication process, and a preservation time point of person region feature information.

The date-and-time information is stored in association with the person region feature information in the second storage unit 112 in FIG. 2, but the date-and-time information is not necessary, and may not be included. In an example of the present example embodiment, the second storage unit 112 stores person region feature information of a person of which a face cannot be authenticated, and does not store person region feature information of a person of which a face has been authenticated, in an individual identification process performed by the collation unit 102. Therefore, the present example embodiment is based on the fact that person members included in the first image 20 are not changed in the second image 22. It should be noted that a case where there is a change from person members detected by a camera 10 will be described in other example embodiments.

Figure 3:
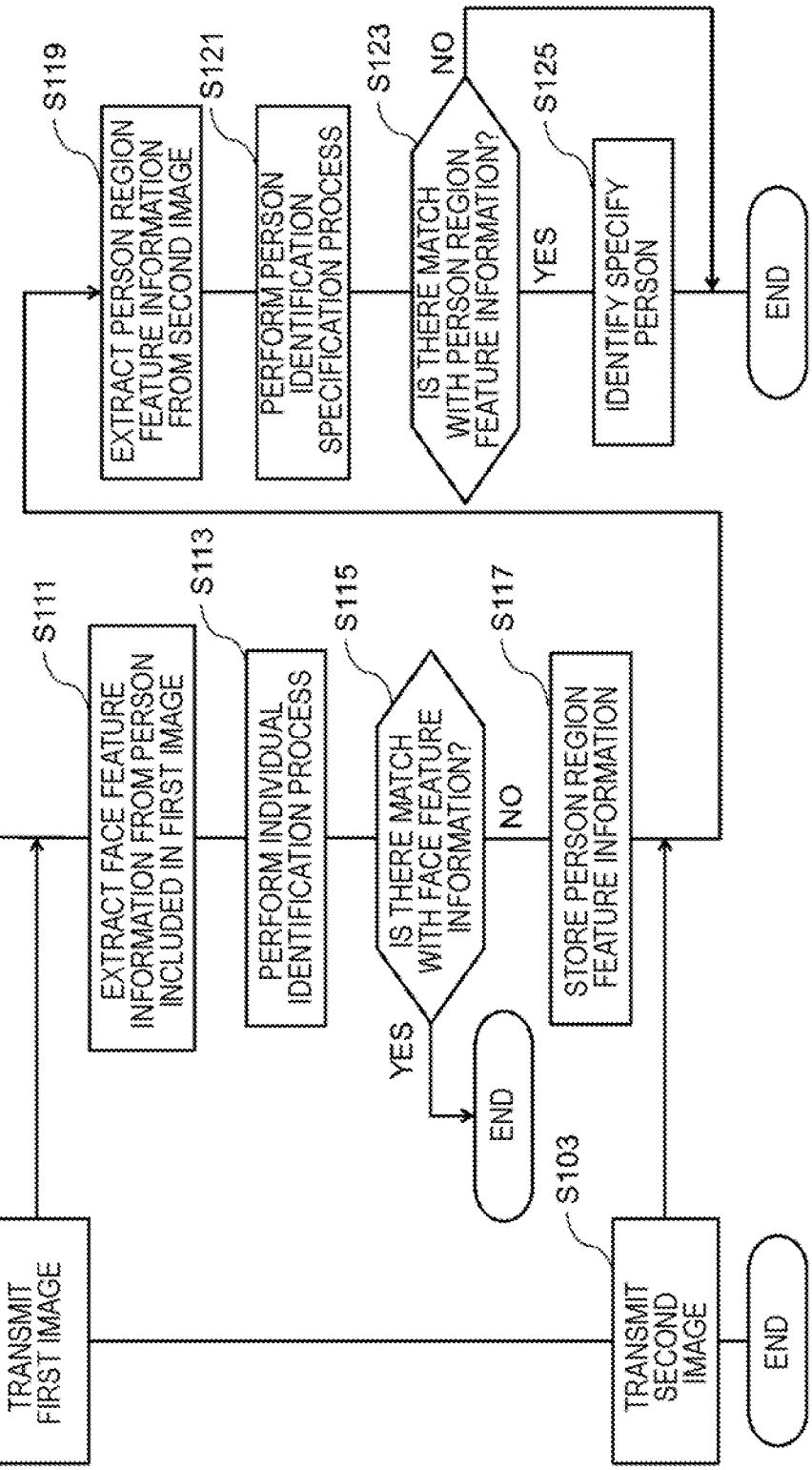
FIG. 3 is a flowchart illustrating an example of an operation of the information processing apparatus in FIG. 1.

Hereinafter, a description will be made of an operation of the information processing apparatus 100 configured as mentioned above. FIG. 3 is a flowchart illustrating an example of an operation of the information processing apparatus 100 of the present example embodiment.

First, a first image obtained by the camera 10 imaging a predetermined area is transmitted to the information processing apparatus 100 (step S101). For example, it is assumed that three persons such as a person A, a person B, and a person C are captured in the first image.

In the information processing apparatus 100, the collation unit 102 extracts face feature information from the persons included in the first image 20 received from the camera 10 (step S111). Here, three persons (the person A, the person B, and the person C) are detected, and face feature information of each thereof is extracted. The collation unit 102 performs a collation process (individual identification process) with face registered feature information stored in the first storage unit 111 on each piece of the extracted face feature information (step S113).

Herein, it is assumed that, with respect to the person A, matching face registered feature information is included in the first storage unit 111 (YES in step S115). Therefore, individual identification of the person A is completed, processes in step S117 and the subsequent steps are not performed, and the present process is finished. On the other hand, since, with respect to the person B and the person C, matching face feature information is not included in the first storage unit 111 (NO in step S115), the flow proceeds to step S117, and person region feature information and date-and-time information corresponding to person regions of the person B and the person C are stored in the second storage unit 112. In other words, the person B and the person C are subsequent tracking target persons.

The captured second image 22 is transmitted from the camera 10 to the information processing apparatus 100 after the first timing at which the first image 20 is acquired (step S103). In the information processing apparatus 100, the collation unit 102 receives the second image 22 from the camera 10, and detects a person region from the received second image 22 so as to extract person region feature information (step S119).

The collation unit 102 performs a process (person specification process) of collating the person region feature information extracted from the second image 22 with registered person region feature information stored in the second storage unit 112 (step S121).

In a case where registered person region feature information matching the extracted person region feature information is included in the second storage unit 112 (YES in step S123), the person B and the person C corresponding to the registered person region feature information are specified in the second image 22 (step S125). The present process is finished.

In the above-described way, the person B and the person C can be tracked in the second image 22.

On the other hand, even though a person (herein, the person A) of which registered person region feature information matching the extracted person region feature information is not included in the second storage unit 112 (NO in step S123) is captured in the second image 22, the person is not a tracking target, step S125 is bypassed, and the present process is finished.

The process in the flowchart is repeatedly performed when an image is transmitted from the camera 10. With respect to the person B and the person C of which person region feature information is stored in the second storage unit 112 in step S117, the processes in step S119 and the subsequent steps may be repeatedly performed whenever the second image 22 is received. In other words, in each second image 22, the person B and the person C corresponding to the person region feature information stored in the second storage unit 112 are continuously tracked.

As described above, in the information processing apparatus 100 of the present example embodiment, the registration unit 104 stores person region feature information of a person who cannot be identified in the first image 20 by the collation unit 102, in the second storage unit 112 as information of an undetermined person. The collation unit 102 collates person region feature information extracted from the second image 22 with registered person region feature information stored in the second storage unit 112, and thus a person corresponding to matching information is specified. According to the configuration, with respect to a person undetermined in the first image 20, a person can be specified on the basis of person region feature information in the second image 22 captured at a timing later than the first image 20, and thus the undetermined person can be continuously tracked.

As mentioned above, according to the present example embodiment, a person who is not authenticated (that is, a person to which attention is required to be paid) can be tracked in a predetermined area after the first timing, and thus person region feature information of the person can be stored as information of an undetermined person in the second storage unit 112. For example, in a case where a suspicious person or the like who cannot be authenticated is mixed into a predetermined area, the person can be continuously tracked.

Second Example Embodiment

The information processing apparatus 100 of the present example embodiment is the same as the information processing apparatus 100 of the above-described example embodiment illustrated in FIG. 1 except that a person included in the second image 22 is specified, and then a collation process using face feature information extracted from the person is performed. The information processing apparatus 100 of the present example embodiment has the same configuration as that of the information processing apparatus 100 of the above-described example embodiment illustrated in FIG. 1, and will thus be described with reference to FIG. 1.

The collation unit 102 collates face feature information extracted from a person specified in the second image 22 with face registered feature information stored in the first storage unit 111 of the storage unit 110.

In other words, a face authentication process is performed on a person who is continuously tracked in the second image 22, and thus individual identification can be performed on an undetermined person. Even though the face is turned away from the camera in the first image 20 captured at the first timing, and thus face authentication is not performed well, in a case where the face is captured in the second image 22 captured after the first timing, there is a probability that face re-authentication may be successful.

Figure 4:
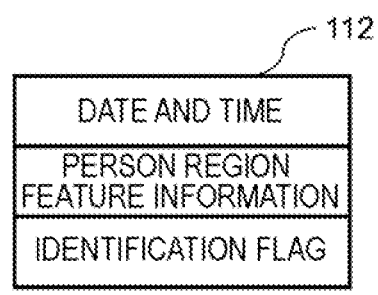
FIG. 4 is a diagram illustrating an example of a data structure of a second storage unit of a storage unit of an information processing apparatus according to a second example embodiment of this disclosure.

FIG. 4 is a diagram illustrating an example of a data structure of the second storage unit 112 of the present example embodiment.

The second storage unit 112 further includes a determination flag in addition to date-and-time information and person region feature information in the second storage unit 112 in FIG. 2. The determination flag is a flag indicating that the person can be identified or cannot be identified through a face authentication process in the collation unit 102, may be set to "1" in a determined state, and may be set to "0" in an undetermined state. Alternatively, the determination flag may be set to "0" in a determined state, and may be set to "1" in an undetermined state. For example, a flag may be set only in a determined state, and NULL may be set in an undetermined state. Alternatively, a flag may be set only before determination, that is, in an undetermined state, and NULL may be set after determination. Alternatively, the execution date and time of a face authentication process in which the person is identified may be stored in the second storage unit 112 in association with person region feature information.

In the present example embodiment, in a case where matching occurs in a collation process with face feature information extracted from a person specified in the second image 22, the registration unit 104 sets a determination flag associated with registered person region feature information corresponding to the person stored in the second storage unit 112 to 1 from 0.

Alternatively, the information processing apparatus 100 may include a deletion unit (not illustrated) which deletes registered person region feature information of a person specified in the second image 22 from the second storage unit 112 in a case where face feature information extracted from the person matches face registered feature information stored in the first storage unit 111 as a collation result. In the configuration of having the deletion unit, a data structure of the second storage unit 112 is the same as the data structure illustrated in FIG. 2 of the above-described example embodiment.

Figure 5A:
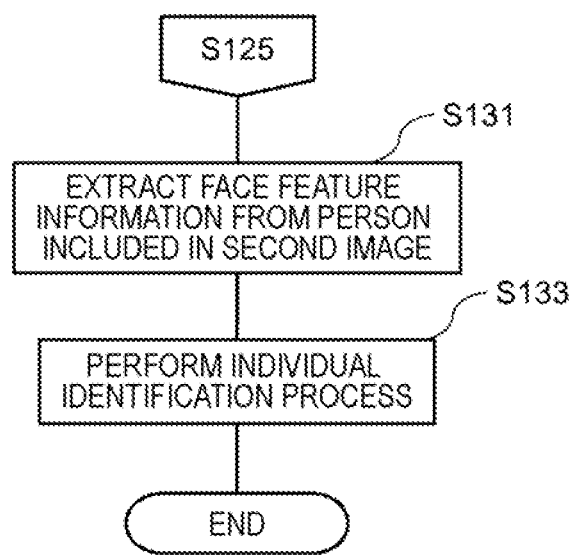
FIG. 5A is a flowchart illustrating an example of procedures after step S125 in FIG. 3
Figure 5B:
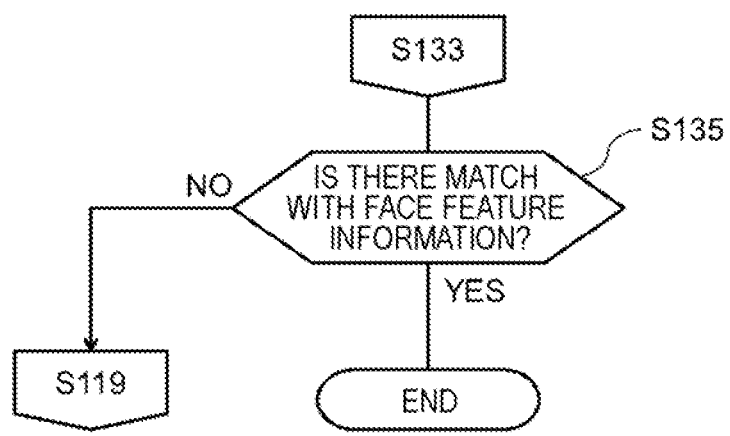
FIG. 5B is a flowchart illustrating an example of the subsequent step S133 in FIG. 5A, in an operation of the information processing apparatus according to the second example embodiment of this disclosure.

FIGS. 5A and 5B are flowcharts each illustrating an example of an operation of the information processing apparatus 100 of the present example embodiment.

A flowchart of FIG. 5A includes step S131 to step S133 after step S125 in the flowchart of FIG. 3.

The collation unit 102 extracts face feature information from the person specified in the second image 22 in step S125 (step S131), performs a collation process (individual identification process) between the extracted face feature information and face registered feature information stored in the first storage unit 111 of the storage unit 110 (step S133), and finishes the present process.

As illustrated in FIG. 5B, the collation unit 102 repeatedly performs processes (step S119 to step S125 in FIG. 3) of specifying a person corresponding to the second registered feature information (registered person region feature information) in the second image 22 and processes (step S131 to step S133 in FIG. 5A) of collating the first feature information (face feature information) extracted from the specified person with the first registered feature information (face registered feature information) until a collation result indicates a match (YES in step S135 in FIG. 5B) (the flow returns to step S119 in FIG. 3).

For example, of the person B and the person C who are being tracked as undetermined persons in the above-described example embodiment, with respect to the person C, it is assumed that a face thereof is not captured in the first image 20, and thus face authentication fails in the individual identification process in step S113 in FIG. 3. However, in a case where the face is captured in the second image 22 captured later than the first image 20, face authentication is successful in the individual identification process in step S133 in FIG. 5A, and thus the person C can be identified.

In the present example embodiment, the collation unit 102 may repeatedly perform a collation process on a plurality of repeatedly captured second images 22 within a predetermined time or during a period till a predetermined time point.

A description will be made of two examples for a process on person region feature information in which face authentication is successful in the collation unit 102 and the person is identified such as an example (FIG. 6A) in which the second storage unit 112 in FIG. 4 is used, and an example (FIG. 6B) in which the information processing apparatus 100 has a deletion unit, and the second storage unit 112 in FIG. 2 is used.

First, a description will be made of the example illustrated in FIG. 6A.

In a case where face feature information extracted from a person specified in step S133 matches any one of pieces of face registered feature information stored in the first storage unit 111 (YES in step S135), the registration unit 104 sets 1 to the determination flag associated with person region feature information corresponding to the person of which the face has been authenticated in the second storage unit 112 in FIG. 4 (step S137). The present process is finished.

Herein, it is assumed that the person C can be identified (YES in step S135), and 1 is set in the determination flag associated with person region feature information corresponding to the person C (step S137).

On the other hand, in a case where the face feature information extracted from the person specified in step S133 does not match any of the pieces of face registered feature information stored in the first storage unit 111 (NO in step S135), step S137 is bypassed, and the present process is finished. In other words, the determination flag associated with person region feature information in the second storage unit 112 in FIG. 4 is still set to 0. In this example, it is assumed that the person B fails in face authentication (NO in step S135), step S137 is bypassed, and the present process is finished. Therefore, the determination flag associated with the person region feature information of the person B is still set to 0.

Figure 6A:
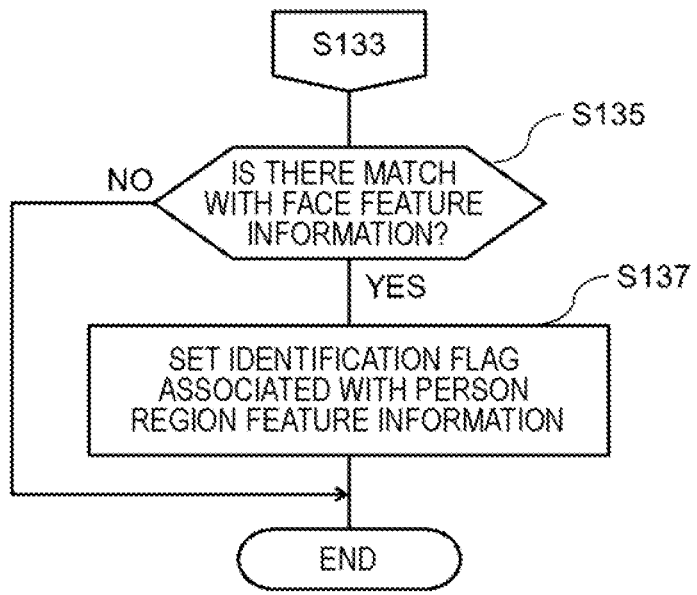
FIGS. 6A and 6B are flowcharts each illustrating an example of procedures of step S135 and the subsequent steps in FIG. 5 in an operation of the information processing apparatus according to the second example embodiment of this disclosure.
Figure 6B:
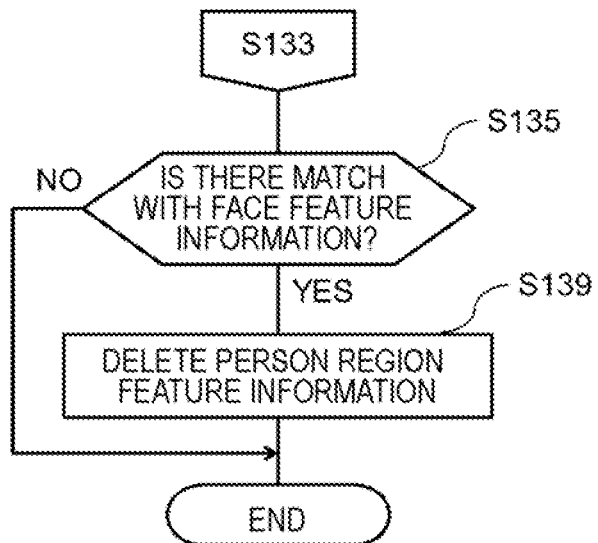

In the example illustrated in FIG. 6B, in a case where face feature information extracted from a person specified in step S133 matches any one of pieces of face registered feature information stored in the first storage unit 111 (YES in step S135), the deletion unit deletes person region feature information corresponding to the person of which the face has been authenticated from the second storage unit 112 in FIG. 2.

Herein, it is assumed that matching face feature information of the person C is included in the first storage unit 111 (YES in step S135), and the deletion unit deletes the person region feature information corresponding to the person C from the second storage unit 112 in FIG. 2 (step S139).

On the other hand, in a case where the face feature information extracted from the person specified in step S133 does not match any of the pieces of face registered feature information stored in the first storage unit 111 (NO in step S135), step S139 is bypassed, and the present process is finished. In other words, the person region feature information is still stored in the second storage unit 112.

Herein, it is assumed that matching face feature information of the person B is not included in the first storage unit 111 (NO in step S135), step S139 is bypassed, and the present process is finished. As mentioned above, in a case of the second storage unit 112 in FIG. 2, only the person region feature information of the person B is still stored in the second storage unit 112.

As described above, according to the present example embodiment, since the collation unit 102 performs a collation process between face feature information extracted from a person specified in the second image 22 and face registered feature information stored in the first storage unit 111, even a person of which a face cannot be authenticated in the first image 20 succeeds in face authentication in the second image 22 captured at a timing later than the first image 20, and thus the person can be identified.

Since information (determination flag) indicating whether or not a face has been authenticated is stored in the second storage unit 112 in association with person region feature information, or person region feature information of a person of which a face has been authenticated is deleted from the second storage unit 112, it is possible to acquire person region feature information of a person of which a face cannot be authenticated within a predetermined time or by a predetermined time point, by referring to the second storage unit 112.

Third Example Embodiment

Figure 7:
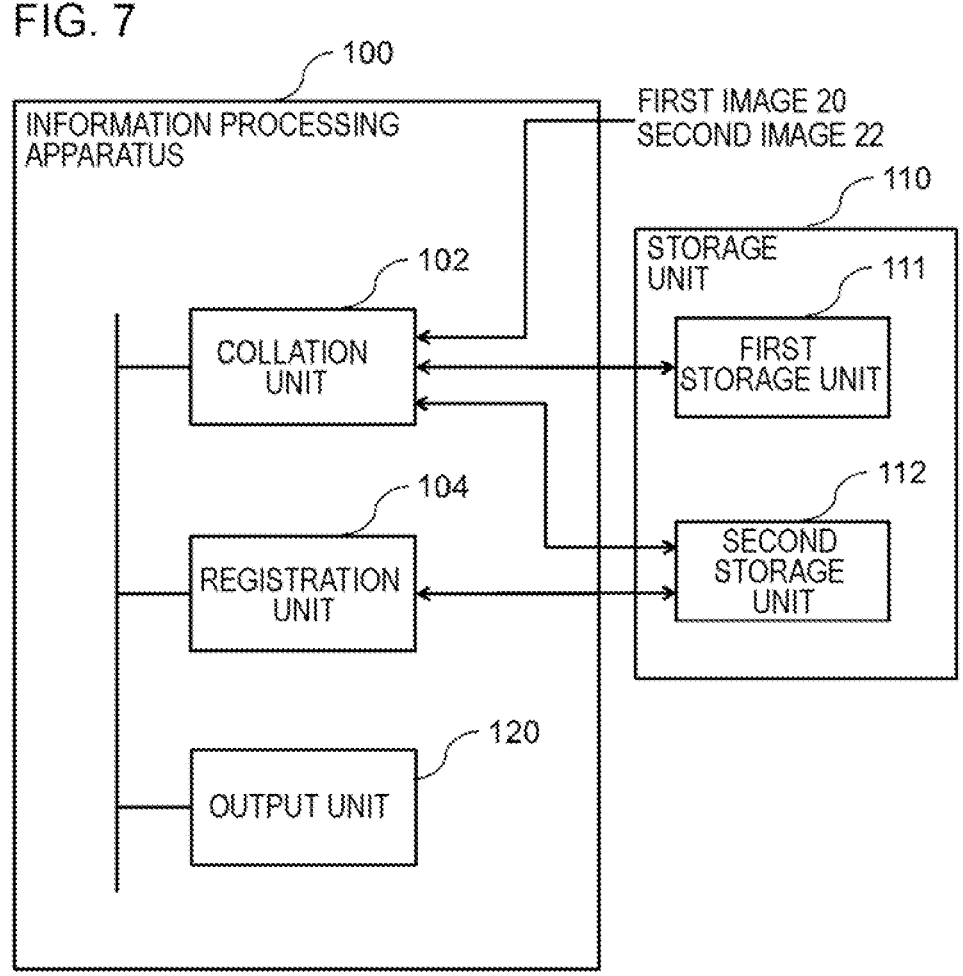
FIG. 7 is a functional block diagram illustrating a logical configuration of an information processing apparatus according to a third example embodiment of this disclosure.

FIG. 7 is a functional block diagram illustrating a logical configuration of an information processing apparatus 100 of the present example embodiment.

The information processing apparatus 100 of the present example embodiment is the same as the information processing apparatus 100 of the above-described example embodiment in FIG. 1 except that an output unit 120 is further provided in addition to the configuration thereof.

In the present example embodiment, the registration unit 104 stores person region feature information in the second storage unit 112 along with time information. The output unit 120 outputs information regarding registered person region feature information stored in the second storage unit 112 according to a predetermined condition.

In an example of a first predetermined condition, in a case where face feature information cannot be extracted from a person specified through collation with registered person region feature information in the second image 22 even though a reference time or more elapses from a time point indicated by the time information, or in a case where a collation result with face feature information extracted from a person specified through collation with registered person region feature information in the second image 22 indicates a mismatch, the output unit 120 outputs information regarding the registered person region feature information.

Here, the time information corresponds to the date-and-time information in the second storage unit 112 in FIG. 2 or 4, and is at least one of a time point at which person region feature information is stored in the second storage unit 112, a time point at which a collation target image is captured (or stored), a time point at which a collation target image is received, a time point at which a collation process is performed, and a time point at which a collation result is stored in the second storage unit 112.

In an example of a second predetermined condition, the output unit 120 outputs information regarding registered person region feature information which is stored in the second storage unit 112 at a reference timing. In a case of the second storage unit 112 in FIG. 2 described in the above-described example embodiment, a person corresponding to registered person region feature information remaining in the second storage unit 112 at a reference timing is an undetermined person who is not identified by the timing. Therefore, the output unit 120 displays information regarding the registered person region feature information, for example, an image of a person region corresponding to the registered person region feature information, and can thus make an operator recognize an undetermined person.

The reference timing is a predetermined time point, the last timing, or an imaging timing in a camera at a predetermined position, or the like.

The output unit 120 displays a captured image on, for example, a display, and also displays a mark indicating whether or not authentication is completed to overlap each person. For example, a mark of "OK" is displayed for an authenticated person, and a mark of "NG" is displayed for an unauthenticated person. The "OK" mark may be displayed for only an authenticated person, or the "NG" mark may be displayed for only an unauthenticated person. An image (for example, person regions are surrounded by rectangular frames with different colors) in which person regions of an authenticated person and an unauthenticated person can be distinguished from each other is drawn to overlap an image in which registered person region feature information is extracted. A person region of an unauthenticated person may be displayed in an emphasis manner.

In addition to screen display, an output form of the output unit 120 may be to output an alert sound from a speaker, to transmit a message to a predetermined destination or terminal, to cause a light emitting diode (LED) indicator to blink or to light, or to output information to a printer such that the information is printed. The output unit 120 may output a locking or unlocking control signal to a locking apparatus of an entrance door in a predetermined area, or may output an opening or closing control signal to a drive apparatus of a gate, an automatic door, or a shutter. In other words, in a case where person region feature information of a person who is not authenticated remains in the second storage unit 112 after a reference time elapses or at a reference timing, a control signal for locking a door or closing a gate may be output to each apparatus such that the person corresponding to the person region feature information cannot enter or exit the area.

The output unit 120 may output, to a camera, a control signal for increasing image quality or a resolution of a captured image including a person region of a person who is not authenticated, or a control signal for tracking or zooming in the person region.

The information regarding the registered person region feature information may include an image of a person region corresponding to the registered person region feature information. The registered person region feature information may include information indicating whether or not authentication is completed, and information regarding a time point at which an image is captured or a time point at which face authentication is performed. In a case where there are a plurality of surveillance target areas, identification information of an area may be included. In a case where a plurality of cameras 10 are used, identification information of the camera 10 having captured an image including a person region corresponding to the registered person region feature information may be included.

Figure 8A:
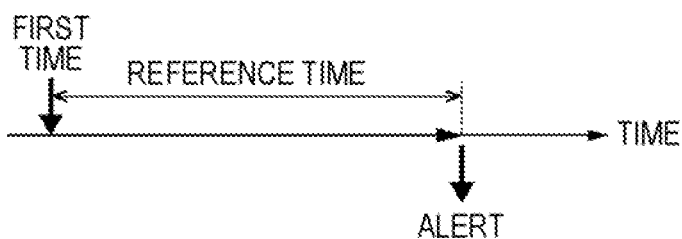
FIGS. 8A to 8C are diagrams for each explaining a timing of information output in an output unit of the information processing apparatus in FIG. 7.
Figure 8B:
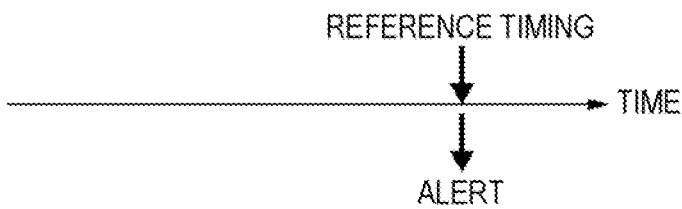
Figure 8C:

FIGS. 8A to 8C are diagrams for each explaining a timing of information output in the output unit 120. FIG. 8C will be described in an example embodiment which will be described later.

In an example illustrated in FIG. 8A, the output unit 120 outputs an alert for person region feature information which has been stored in the second storage unit 112 for a reference time or more from a time point of a timing at which the person region feature information is stored for the first time.

In this example, it is possible to monitor whether or not face authentication can be performed within a reference time for each person.

In an example illustrated in FIG. 8B, the output unit 120 outputs an alert for person region feature information remaining at a certain reference timing, for example, a predetermined time point with respect to person region feature information stored in the second storage unit 112.

As described above, in the present example embodiment, the registration unit 104 stores person region feature information in the second storage unit 112 along with time information, and the output unit 120 outputs information regarding registered person region feature information of a person of which a face is not authenticated even though a reference time or more elapses from a time point indicated by the time information. According to the present example embodiment, it is possible to achieve the same effect as in the above-described example embodiment, and also to perform a notification of a person who cannot be authenticated in a certain area for a predetermined time or more or by a predetermined time point.

In the present example embodiment, the output unit 120 outputs information regarding registered person region feature information stored in the second storage unit 112 at a reference timing. According to the present example embodiment, it is possible to perform for each predetermined time point a notification of a person which cannot be authenticated.

Fourth Example Embodiment

The information processing apparatus 100 of the present example embodiment is the same as the information processing apparatus 100 of the above-described example embodiment except that pieces of person region feature information of all persons extracted from the first image are stored in the second storage unit 112, a face authentication process is repeatedly performed until the face authentication is successful while tracking a person by using registered person region feature information. The information processing apparatus 100 of the present example embodiment has the same configuration as that of the information processing apparatus 100 of the above-described example embodiment illustrated in FIG. 1, and will thus be described with reference to FIG. 1. The information processing apparatus 100 of the present example embodiment may have the same configuration as that of the information processing apparatus 100 of the other example embodiments, and the configurations may be combined with each other within the scope without contradiction.

The present example embodiment is different from the above-described example embodiments in terms of the following contents.

The registration unit 104 stores person region feature information extracted from a person included in the first image 20 in the second storage unit 112 as registered person region feature information.

The collation unit 102 collates person region feature information extracted from a person included in the second image 22 with registered person region feature information stored in the second storage unit 112, and thus specifies a person corresponding to the registered person region feature information in the second image 22. In a case where face feature information cannot be extracted from a person included in the first image 20, or a collation result between face feature information extracted from a person included in the first image 20 with the first registered feature information (face registered feature information) indicates a mismatch, the collation unit 102 collates face feature information extracted from a person specified in the second image 22 with face registered feature information stored in the first storage unit 111.

The registration unit 104 may store information indicating a collation result between face feature information extracted from a person included in the first image 20 and face registered feature information in the second storage unit 112 in association with registered person region feature information. Alternatively, the registration unit 104 may store information indicating that face feature information cannot be extracted from a person included in the first image 20 in the second storage unit 112 in association with registered person region feature information.

Figure 9:
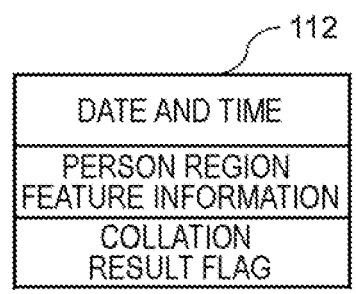
FIG. 9 is a diagram illustrating an example of a data structure of a second storage unit of a storage unit in FIG. 7.

FIG. 9 is a diagram illustrating an example of a data structure of the second storage unit 112 of the present example embodiment.

The second storage unit 112 stores date-and-time information, person region feature information, a collation result flag in association with each other. The date-and-time information is at least one of a capturing time point of the first image 20, an acquisition time point of the first image 20, an execution time point of an authentication process based on the first image 20, an acquisition time point of a result of the authentication process, and a preservation time point of registered person region feature information.

The collation result flag is information indicating a collation result of face feature information in the collation unit 102. The information indicating a collation result includes at least one of information indicating a match with face registered feature information and information indicating a mismatch with face registered feature information.

In a case where there is matching face registered feature information in the first storage unit 111 in a collation process, that is, the person can be identified, for example, "1" is set in the collation result flag. In a case where there is no matching face registered feature information, for example, "0" is set in the collation result flag. For example, only in a case of a match, the collation result flag may be set, and, in a case where there is no matching face feature information, NULL may be set. Alternatively, the collation result flag may be set to "0" in a case of a match, and may be set to "1" in a case of a mismatch. The collation result flag may be set in a case of a mismatch, and NULL may be set in a case of a match.

In a case where the information indicating a collation result indicates that a collation result with face feature information extracted from a person included in the first image 20 indicates a mismatch, the collation unit 102 collates face feature information extracted from a person specified in the second image 22 with face registered feature information stored in the first storage unit 111.

In a case where information associated with registered person region feature information indicates that face feature information cannot be extracted from a person included in the first image 20, the collation unit 102 collates face feature information extracted from a person specified in the second image 22 with face registered feature information stored in the first storage unit 111.

The information processing apparatus 100 of the present example embodiment may include the same output unit 120 as that of the information processing apparatus 100 of the above-described example embodiment illustrated in FIG. 7.

Figure 10:
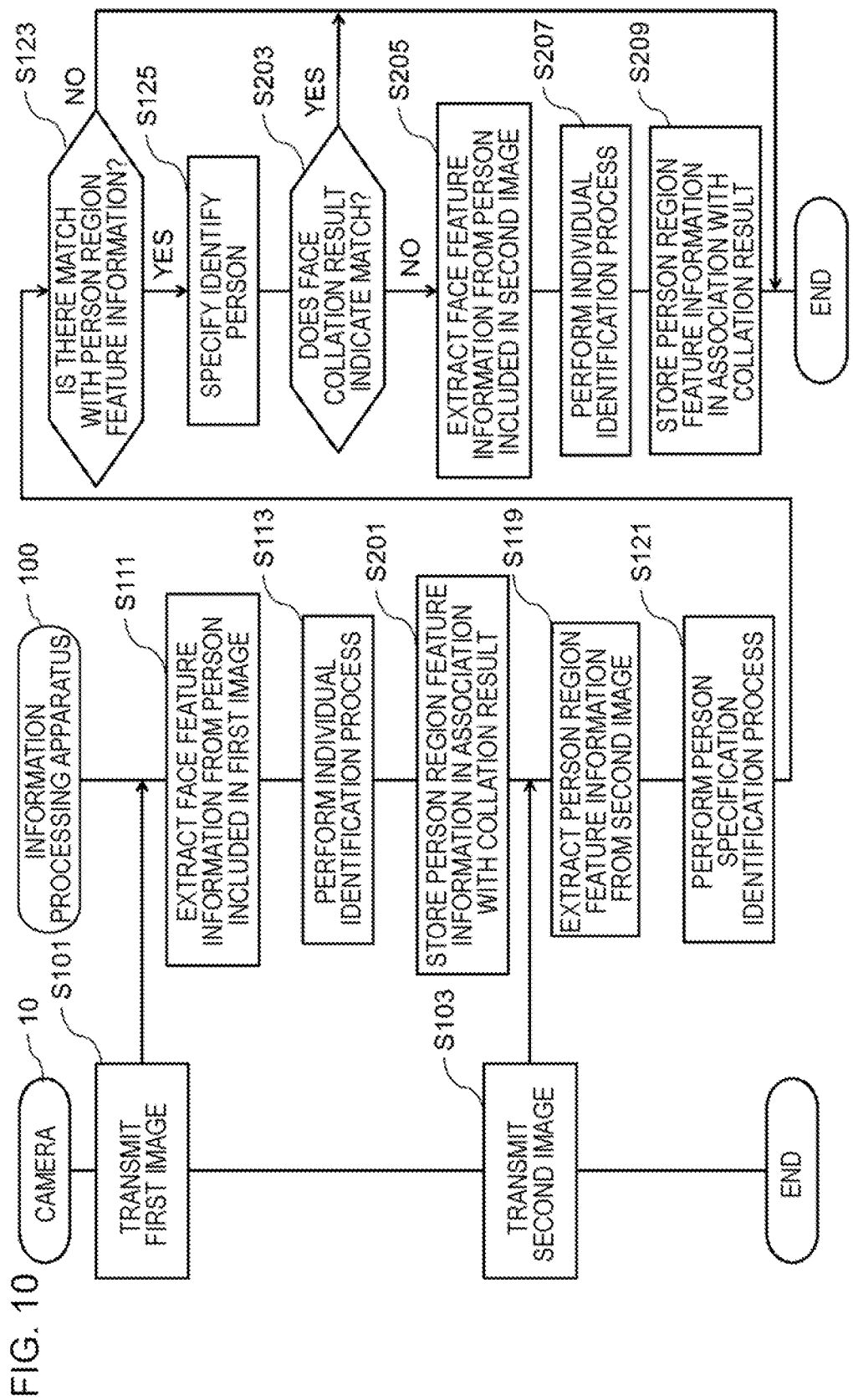
FIG. 10 is a flowchart illustrating an example of an operation of an information processing apparatus according to a fourth example embodiment of this disclosure.

FIG. 10 is a flowchart illustrating an example of an operation of the information processing apparatus 100 of the present example embodiment.

It should be noted that, in FIG. 10, the same process procedure as in the above-described example embodiment is given the same step number.

First, the first image 20 obtained by the camera 10 imaging a predetermined area is transmitted to the information processing apparatus 100 (step S101). For example, it is assumed that three persons such as a person A, a person B, and a person C are captured in the first image 20.

In the information processing apparatus 100, the collation unit 102 extracts face feature information from the persons included in the first image 20 received from the camera 10 (step S111). Here, three persons (the person A, the person B, and the person C) are detected, and face feature information of each thereof is extracted. The collation unit 102 performs a collation process (individual identification process) with face registered feature information stored in the first storage unit 111 on each piece of the extracted face feature information (step S113).

Herein, it is assumed that matching face registered feature information of the person A is included in the first storage unit 111. In other words, since individual identification of the person A is completed, the registration unit 104 sets "1" in a collation result flag for the person A as information indicating a match, and stores the collation result flag in the second storage unit 112 in association with person region feature information and date-and-time information (step S201).

On the other hand, it is assumed that, with respect to the person B and the person C, matching face feature information is not included in the first storage unit 111. Therefore, the registration unit 104 sets "0" in collation result flags for the person B and the person C as information indicating a mismatch, and stores the collation result flags in the second storage unit 112 in association with person region feature information and date-and-time information (step S201).

The captured second image 22 is transmitted from the camera 10 to the information processing apparatus 100 after the first timing at which the first image 20 is acquired (step S103). In the information processing apparatus 100, the collation unit 102 receives the second image 22 from the camera 10, and detects a person region from the received second image 22 so as to extract person region feature information (step S119).

The collation unit 102 performs a process (person specification process) of collating the person region feature information extracted from the second image 22 with registered person region feature information stored in the second storage unit 112 (step S121). In a case where registered person region feature information matching the extracted person region feature information is included in the second storage unit 112 (YES in step S123), a person corresponding to the registered person region feature information is specified in the second image 22 (step S125). In this example, the three persons stored in the second storage unit 112, that is, the person A, the person B, and the person C are specified.

In a case where a collation result flag indicating that a collation result of face feature information of each person indicates a match is not set to "1" (NO in step S203) by referring to the second storage unit 112, the collation unit 102 proceeds to step S205. In a case where a collation result indicates a match, that is, the collation result flag is set to "1" (YES in step S203), step S205 to step S209 are bypassed, and the present process is finished. Herein, a collation result flag for the person A is 1, and thus the process for the person A is finished. Since collation result flags for the person B and the person C are 0, the flow proceeds to step S205.

The collation unit 102 extracts face feature information from each specified person (step S205). Herein, face feature information of each of two persons (the person B and the person C) is extracted. The collation unit 102 performs a collation process (individual identification process) with the face registered feature information stored in the first storage unit 111 on each piece of the extracted face feature information (step S207).

Herein, it is assumed that matching face feature information of the person C is included in the first storage unit 111. In other words, since individual identification of the person C is completed, the registration unit 104 sets "1" in a collation result flag for the person C as information indicating a match, stores the collation result flag in association with person region feature information and date-and-time information corresponding to the person C (step S209), and finishes the present process.

On the other hand, it is assumed that matching face feature information of the person B is not included in the first storage unit 111. The registration unit 104 sets "0" in a collation result flag for the person B as information indicating a mismatch, stores the collation result flag in association with person region feature information and date-and-time information corresponding to the person B (step S209), and finishes the present process.

In the above-described way, it is possible to perform face re-authentication of a person of which a face cannot be authenticated while continuously tracking each person (the person A, the person B, and the person C) by using the second image 22. It is possible to identify the person by performing face authentication by using an image captured when a person with a face not initially directed to a camera directs the face to the camera thereafter.

In step S209, both of the person region feature information stored in the second storage unit 112 and the person region feature information already stored in the second storage unit 112 in step S201 may be stored in association with each other. Alternatively, the person region feature information specified in step S207 may be overwritten on the person region feature information in the second storage unit 112, and only the collation result flag may be updated by leaving the person region feature information already stored in the second storage unit 112 in step S201.

In the process in the flowchart, the processes in step S119 and the subsequent steps are repeatedly performed when the second image 22 is transmitted from the camera 10.

In a case where a new person D not included in the first image 20 is detected in the second image 22, that is, person region feature information matching person region feature information extracted from the second image 22 is not stored in the second storage unit 112 (NO in step S123), the flow may return to step S111 with the second image 22 as the first image 20, and the process may be repeatedly performed on the person region feature information, corresponding to the new person D.

In the present example embodiment, step S131 to step S133 in FIG. 5A, step S135 in FIG. 5B, and step S135 to step S137 in FIG. 6A, or step S135 to step S139 in FIG. 6B may be executed after step S209.

As described above, in the present example embodiment, the registration unit 104 stores person region feature information extracted from a person included in the first image 20 in the second storage unit 112 in association with information indicating a collation result of face authentication in the collation unit 102. Each person corresponding to person region feature information stored in the second storage unit 112 can be tracked by being specified in the second image 22 captured at a timing later than the first image 20. Among persons specified in the second image 22, the collation unit 102 performs a face authentication process on a person who is not identified yet through face authentication.

According to the present example embodiment, it is possible to achieve the same effect as that in the above-described example embodiments, and also to identify a person of which face authentication is not completed by performing face authentication on the person while tracking a person included in an image by using person region feature information.

In the present example embodiment, the registration unit 104 stores person region feature information in the second storage unit 112 in association with collation results of face authentication for all persons included in each image. According to this configuration, even in a case where persons enter and exit a predetermined area, it is possible to continuously track each person and to perform an individual identification process. It is also possible to count and check the number of persons present in a predetermined area, and to check a person having entered the area or having exited the area along with time information.

Fifth Example Embodiment

The information processing apparatus 100 of the present example embodiment is the same as that of any one of the first to third example embodiments except for a configuration for finding a person who is not authenticated between a start point of a predetermined path to an end point thereof by using captured images from a plurality of cameras provided along the path unlike the above-described example embodiments.

The information processing apparatus 100 of the present example embodiment has the same configuration as that of the information processing apparatus 100 in FIG. 1, and will thus be described with reference to FIG. 1.

The information processing apparatus 100 processes an image generated by each of a plurality of cameras 10 provided along a path.

The path includes at least two different points (for example, a start point and an end point), and is a route along which a person passes between the two points. The path may be, for example, a route along which a person passes from entry through an entrance of a certain facility, building, or area to exit through an exit thereof, an approach along which a person enters a certain site through an entrance thereof and passes until entering a building through a doorway thereof, a passage along which a person moves from a certain area to another area, or a path along which a person passes from entry through a gate of a certain station to exit through a gate of another station. A route along which a person passes between two points may differ in each person.

A plurality of cameras provided along a path include at least two cameras such as a first camera provided at a start point through which a person enters the path and a second camera provided at an end point through which the person exits the path.

In the present example embodiment, the first image 20 is an image captured by the first camera. The second image 22 is an image captured by the second camera located after the first camera in a direction along the path. The second image 22 is captured at a timing after a first timing at which the first image 20 is captured. It should be noted that a direction along the path may differ in each person.

Specifically, the collation unit 102 collates face feature information extracted from a person included in the first image 20 with face registered feature information stored in the first storage unit 111 of the storage unit 110.

In a case where face feature information cannot be extracted from a person, or a collation result in the collation unit 102 indicates a mismatch, the registration unit 104 stores person region feature information extracted from the person in the second storage unit 112 of the storage unit 110 as registered person region feature information.

The collation unit 102 collates person region feature information extracted from the person included in the second image 22 with the registered person region feature information stored in the second storage unit 112, and thus specifies the person corresponding to the registered person region feature information in the second image 22.

Among a plurality of cameras provided along the path, the second camera is provided in a plurality at a predetermined interval or at predetermined positions between the start point to the end point along the path.

The collation unit 102 performs a collation process with the person region feature information stored in the second storage unit 112 on the second images 22 captured by the plurality of second cameras, and thus specifies the person corresponding to the person region feature information. Consequently, the information processing apparatus 100 of the present example embodiment can track each person region (person) passing along the path in a plurality of images captured time points which are different from the first timing, captured at different positions, or captured by a plurality of different second cameras.

The second storage unit 112 of the present example embodiment may have the data structure in FIG. 2 or 4.

The information processing apparatus 100 of the present example embodiment may include the same output unit 120 as that in the third example embodiment illustrated in FIG. 7. The output unit 120 of the present example embodiment is different from the output unit 120 of the third example embodiment in terms of the following output conditions. It should be noted that the output unit 120 of the present example embodiment may have a configuration using a combination with the same condition as in the output unit 120 of the third example embodiment.

An output condition of the output unit 120 is that there is no match with face feature information in a collation process performed by the collation unit 102 with respect to a person who is specified by the collation unit 102 by using an image generated by the second camera provided last (end point) or at a predetermined position in a direction along the path among a plurality of second cameras.

In a case where a collation result with face registered feature information indicates a mismatch with respect to a person region specified by the collation unit 102 in an image generated by the second camera provided last (end point) or at a predetermined position in a direction along the path among a plurality of second cameras, the output unit 120 outputs information regarding person region feature information extracted from the person.

The registration unit 104 may store person region feature information in the second storage unit 112 along with time information, and the output unit 120 may output information regarding person region feature information of which a collation result with face registered feature information stored in the second storage unit 112 indicates a mismatch even though a reference time or more elapses from a time point indicated by the time information.

Here, the case where a collation result indicates a mismatch includes a case where face feature information cannot be extracted from a person specified in the second image 22 or a case where a collation result between face feature information extracted from a person specified in the second image 22 and face registered feature information indicates a mismatch.

In addition to the output form of the output unit 120 of the above-described example embodiment, the output unit 120 of the present example embodiment may output, for example, an opening or closing control signal to a drive apparatus of gates provided at both ends or in the middle of the path. In other words, in a case where there is no match with face feature information in a collation process performed by the collation unit 102 with respect to a person who is specified by the collation unit 102 by using an image generated by the second camera provided at a predetermined location on the path, a control signal for closing a gate provided in the middle of the path or provided at a doorway may be output to a grate drive apparatus such that the person cannot pass along the path.

As illustrated in FIG. 8C, the output unit 120 outputs information regarding person region feature information remaining in the second storage unit 112 at a time point at which a person having entered the path through an entrance exits the path through an exit.

Figure 11:
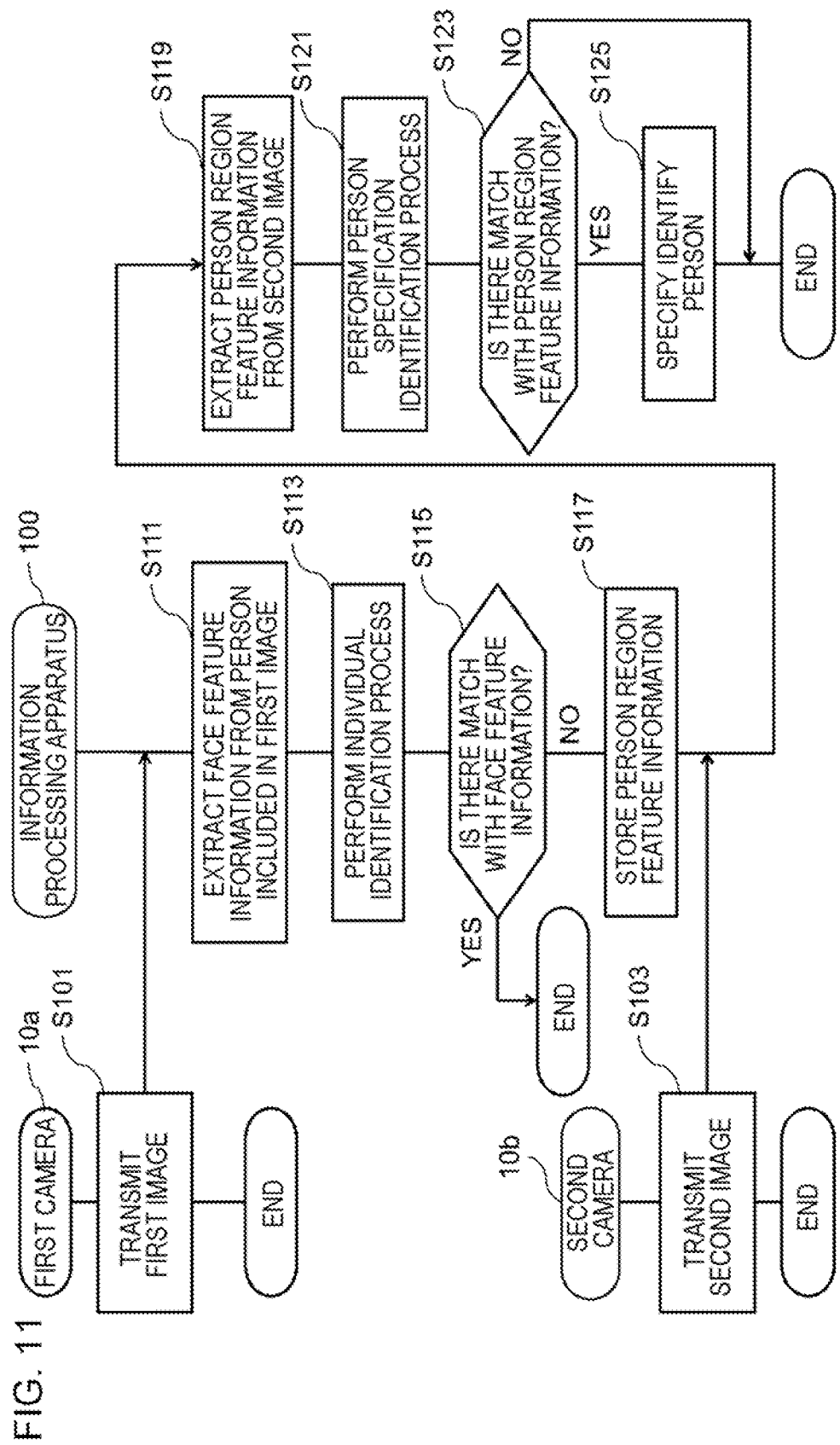
FIG. 11 is a flowchart illustrating an example of an operation of an information processing apparatus according to a fifth example embodiment of this disclosure.

FIG. 11 is a flowchart illustrating an example of an operation of the information processing apparatus 100 of the present example embodiment.

First, the first image 20 obtained by a first camera (referred to as a first camera 10a in some cases) provided at an entrance of a path imaging a predetermined area is transmitted to the information processing apparatus 100 (step S101). For example, it is assumed that three persons such as a person A, a person B, and a person C are captured in the first image 20.

In the information processing apparatus 100, the collation unit 102 extracts face feature information from the persons included in the first image 20 received from the first camera 10a (step S111). Here, three persons (the person A, the person B, and the person C) are detected, and face feature information of each thereof is extracted. The collation unit 102 performs a collation process (individual identification process) with face registered feature information stored in the first storage unit 111 on each piece of the extracted face feature information (step S113).

Herein, it is assumed that matching face registered feature information of the person A is included in the first storage unit 111 (YES in step S115). Therefore, individual identification of the person A is completed, processes in step S117 and the subsequent steps are not performed, and the present process is finished. On the other hand, since, with respect to the person B and the person C, matching face feature information is not included in the first storage unit 111 (NO in step S115), the flow proceeds to step S117, and person region feature information and date-and-time information corresponding to the person B and the person C are stored in the second storage unit 112.

The captured second image 22 is transmitted from a second camera (referred to as a second camera 10b in some cases) which is located after the first camera 10a in a direction along the path, to the information processing apparatus 100 after the first timing at which the first image 20 is acquired (step S103). In the information processing apparatus 100, the collation unit 102 receives the second image 22 from the second camera 10b, and detects a person region from the received second image 22 so as to extract person region feature information (step S119).

The collation unit 102 performs a process (person specification process) of collating the person region feature information extracted from the second image 22 with registered person region feature information stored in the second storage unit 112 (step S121). In a case where registered person region feature information matching the extracted person region feature information is included in the second storage unit 112 (YES in step S123), the person B and the person C corresponding to the registered person region feature information are specified in the second image 22 (step S125). The present process is finished.

In the above-described way, the person B and the person C can be tracked in the second image 22.

On the other hand, a person (herein, the person A) of which registered person region feature information matching the extracted person region feature information is not included in the second storage unit 112 (NO in step S123) is not a tracking target, step S125 is bypassed, and the present process is finished.

The process in the flowchart is repeatedly performed when an image is transmitted from each camera 10. In step S117, with respect to the person B and the person C of which person region feature information is stored in the second storage unit 112, the processes in step S119 and the subsequent steps may be repeatedly performed whenever the second image 22 is received. In other words, in each second image 22, the person B and the person C corresponding to the person region feature information stored in the second storage unit 112 are continuously tracked.

As described above, in the information processing apparatus 100 of the present example embodiment, the registration unit 104 stores, as information of an undetermined person, person region feature information of a person region in which a face authentication process cannot be performed on the first image 20 which is captured by the first camera 10a at the first timing by using captured images from a plurality of cameras provided along the path, in the second storage unit 112. The collation unit 102 specifies a person matching person region feature information stored in the second storage unit 112 in the second image 22 which is captured by the second camera 10b located after of the first camera 10a in a direction along the path after the first timing.

As mentioned above, according to the present example embodiment, it is possible to store person region feature information of a person who cannot be identified through face authentication from entry into the path to exit from the path, in the second storage unit 112 as information of an undetermined person. For example, in a case where a person of which face feature information is not stored in the first storage unit 111 and who is not originally permitted to pass along a path tries to pass along the path, person region feature information of the person can be stored in the second storage unit 112 and be tracked.

In the present example embodiment, the registration unit 104 stores person region feature information in the second storage unit 112 along time information of a timing at which the person region feature information is stored for the first time, and the output unit 120 outputs information regarding person region feature information which has been stored in the second storage unit 112 for a reference time or more.

Alternatively, in the present example embodiment, the output unit 120 outputs information regarding person region feature information of a person in a case where a collation process with face feature information indicates a mismatch with respect to the person who is specified by the collation unit 102 by using an image generated by the second camera provided last or at a predetermined position in a direction along the path among a plurality of second cameras.

According to this configuration, among persons passing along the path, it is possible to perform a notification of information regarding a person who cannot be identified through face authentication at a location where the person comes out of an exit of the path or at a predetermined position. For example, face registered feature information of a person who is permitted to pass along a path is stored in the first storage unit 111, and it is possible to perform a notification of passing of a person of which a collation result with face registered feature information stored in the first storage unit 111 indicates a mismatch, that is, the person who is not permitted to pass along the path, at an exit of the path along which the person is required to be permitted to pass.

Sixth Example Embodiment

The information processing apparatus 100 of the present example embodiment stores, in the second storage unit 112, person region feature information extracted from a person included in the first image 20 captured by a first camera among a plurality of cameras provided along a path regardless of a collation result of face authentication, and specifies and tracks a person by using the person region feature information stored in the second storage unit 112 in the second image 22 captured by a second camera located after the first camera in a direction along the path.

The information processing apparatus 100 of the present example embodiment has the same configuration as that of the information processing apparatus 100 of the fourth example embodiment except that a process is performed by using the first image 20 captured by a first camera among a plurality of cameras provided along a path and the second image 22 captured by a second camera located after the first camera in a direction along the path.

The collation unit 102 collates face feature information extracted from a person included in the first image 20 captured by the first camera among a plurality of cameras provided along a path, with face registered feature information stored in the first storage unit 111. The registration unit 104 stores the person region feature information extracted from the person in the second storage unit 112 (FIG. 9). The collation unit 102 collates person region feature information extracted from a person included in the second image 22 generated by each of a plurality of second cameras located after the first camera in a direction along the path, with registered person region feature information stored in the second storage unit 112, so as to specify a person in the second image 22, and tracks the person.

In a case where face feature information cannot be extracted from a person included in the first image 20, or a collation result between face feature information extracted from a person included in the first image 20 with face registered feature information indicates a mismatch, the collation unit 102 collates face feature information extracted from a person specified in the second image 22 with face registered feature information stored in the first storage unit 111.

Figure 12:
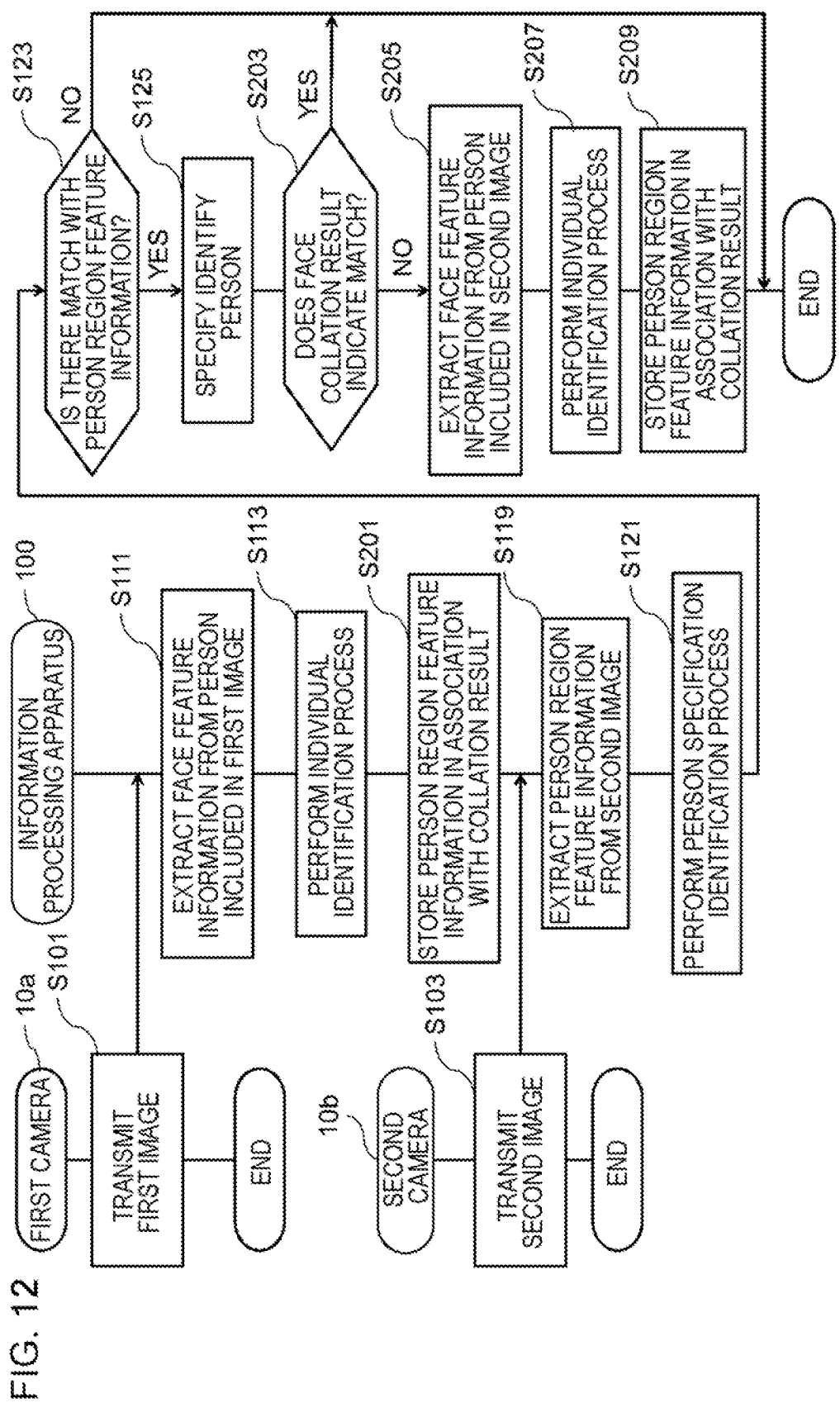
FIG. 12 is a flowchart illustrating an example of an operation of an information processing apparatus according to a sixth example embodiment of this disclosure.

A description will be made of an operation of the information processing apparatus 100 of the present example embodiment having the configuration. FIG. 12 is a flowchart illustrating an example of an operation of the information processing apparatus 100 of the present example embodiment. In the following description, the second storage unit 112 will be described to have the data structure in FIG. 9, but a collation result flag is not necessarily required to be used, and the second storage unit 112 may include at least person region feature information.

First, the first image 20 obtained by the first camera 10*a* provided at an entrance of a path imaging a predetermined area is transmitted to the information processing apparatus 100 (step S101). For example, it is assumed that three persons such as a person A, a person B, and a person C are captured in the first image 20.

In the information processing apparatus 100, the collation unit 102 extracts face feature information from the persons included in the first image 20 received from the first camera 10*a* among the plurality of cameras 10 (step S111). Here, three persons (the person A, the person B, and the person C) are detected, and extracts face feature information of each person. The collation unit 102 performs a collation process (individual identification process) with face registered feature information stored in the first storage unit 111 on each piece of the extracted face feature information (step S113).

Herein, it is assumed that matching face registered feature information of the person A is included in the first storage unit 111. In other words, since individual identification of the person A is completed, the registration unit 104 sets "1" in a collation result flag for the person A as information indicating a match, and stores the collation result flag in the second storage unit 112 in association with person region feature information and date-and-time information (step S201).

On the other hand, it is assumed that, with respect to the person B and the person C, matching face feature information is not included in the first storage unit 111. Therefore, the registration unit 104 sets "0" in collation result flags for the person B and the person C as information indicating a mismatch, and stores the collation result flags in the second storage unit 112 in association with person region feature information and date-and-time information (step S201).

The captured second image 22 is transmitted from the second camera 10*b* which is located after the first camera 10*a* in a direction along the path, to the information processing apparatus 100 after the first timing at which the first image 20 is acquired (step S103). In the information processing apparatus 100, the collation unit 102 receives the second image 22 from the second camera 10*b*, and detects a person region from the received second image 22 so as to extract person region feature information (step S119).

The collation unit 102 performs a process (person specification process) of collating the person region feature information extracted from the second image 22 with registered person region feature information stored in the second storage unit 112 (step S121). In a case where registered person region feature information matching the extracted person region feature information is included in the second storage unit 112 (YES in step S123), the person B and the person C corresponding to the registered person region feature information are specified in the second image 22 (step S125). In this example, three persons such as the person A, the person B, and the person C stored in the second storage unit 112 are specified.

In a case where a collation result flag is not set to "1" indicating that a collation result of face feature information of each person indicates a match (NO in step S203) by referring to the second storage unit 112, the collation unit 102 proceeds to step S205. In a case where a collation result indicates a match, that is, the collation result flag is set to "1" (YES in step S203), step S205 to step S209 are bypassed, and the present process is finished. Herein, a collation result flag for the person A is 1, and thus the process for the person A is finished. Since collation result flags for the person B and the person C are 0, the flow proceeds to step S205.

The collation unit 102 extracts face feature information from each specified person (step S205). Herein, face feature information of each of two persons (the person B and the person C) is extracted. The collation unit 102 performs a collation process (individual identification process) with the face registered feature information stored in the first storage unit 111 on each piece of the extracted face feature information (step S207).

Herein, it is assumed that matching face feature information of the person C is included in the first storage unit 111. In other words, since individual identification of the person C is completed, the registration unit 104 sets "1" in a collation result flag for the person C as information indicating a match, stores the collation result flag in association with person region feature information and date-and-time information corresponding to the person C (step S209), and finishes the present process.

On the other hand, it is assumed that matching face feature information of the person B is not included in the first storage unit 111. The registration unit 104 sets "0" in a collation result flag for the person B as information indicating a mismatch, stores the collation result flag in association with person region feature information and date-and-time information corresponding to the person B (step S209), and finishes the present process.

In the above-described way, it is possible to perform face re-authentication of a person of which a face cannot be authenticated while continuously tracking each person (the person A, the person B, and the person C) by using the second images 22 which are captured by using a plurality of cameras on the path. Since a face authentication process is repeatedly performed by using a plurality of images captured by a plurality of cameras while persons are passing along a path, it is possible to identify a person who initially does not direct the face to a camera by performing face authentication by using an image captured when the person directs the face to the camera next.

In step S209, both of the person region feature information stored in the second storage unit 112 and the person region feature information already stored in the second storage unit 112 in step S201 may be stored in association with each other. Alternatively, the person region feature information specified in step S207 may be overwritten on the person region feature information in the second storage unit 112, and only the collation result flag may be updated by leaving the person region feature information already stored in the second storage unit 112 in step S201.

In the process in the flowchart, the processes in step S119 and the subsequent steps are repeatedly performed whenever the second image 22 is transmitted from the camera 10.

In a case where a new person D not included in the first image 20 is detected in the second image 22, that is, person region feature information matching person region feature information extracted from the second image 22 is not stored in the second storage unit 112 (NO in step S123), the flow may return to step S111 with the second image 22 as the first image 20, and the process may be repeatedly performed on the person region feature information corresponding to the new person D.

In the present example embodiment, step S131 to step S133 in FIG. 5A, step S135 in FIG. 5B, and step S135 to step S137 in FIG. 6A, or step S135 to step S139 in FIG. 6B may be executed after step S209.

According to this configuration, even in a case where a person turns back in the middle of a path, the person can be specified and be tracked by using the second image 22 captured after the first image 20 is captured and person region feature information stored in the second storage unit 112.

Also in this configuration, the output unit 120 described with reference to FIG. 7 may be provided.

Specifically, the output unit 120 outputs information regarding person region feature information of a person in a case where there is no match with face registered feature information stored in the first storage unit 111 with respect to the person who is specified by the collation unit 102 by using an image generated by a camera provided last or at a predetermined position on the path among a plurality of cameras.

Figure 13:
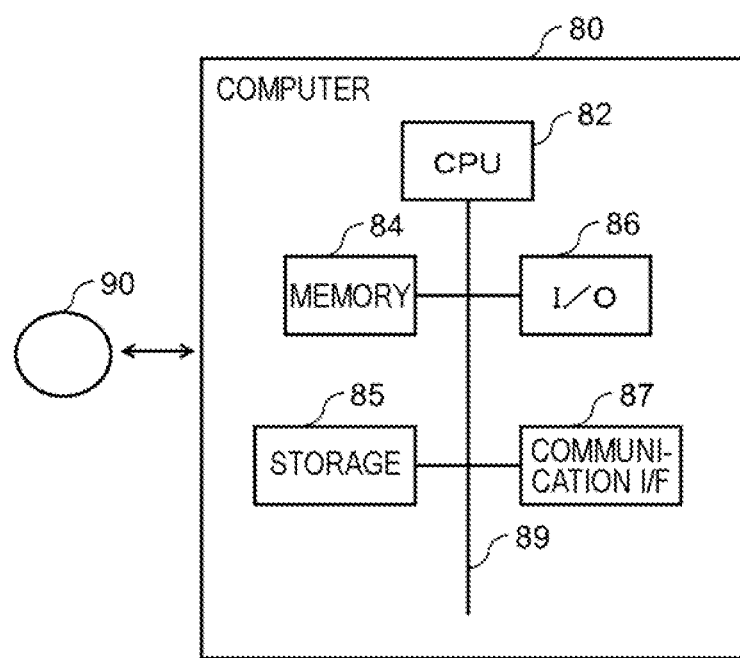
FIG. 13 is a diagram illustrating an example of a computer implementing the information processing apparatus of each example embodiment.

FIG. 13 is a diagram illustrating an example of a configuration of a computer 80 realizing the information processing apparatus of each of the above-described example embodiments.

The computer 80 includes a central processing unit (CPU) 82, a memory 84, a program 90, loaded to the memory 84, for implementing the constituent elements of each information processing apparatus in FIGS. 1 and 7, a storage 85 storing the program 90, an input/output (I/O) 86, and a network connection interface (communication I/F 87).

The CPU 82, the memory 84, the storage 85, the I/O 86, and the communication I/F 87 are connected to each other through a bus 89, and the entire information processing apparatus is controlled by the CPU 82. However, a method of connecting the CPU 82 and the like to each other is not limited to bus connection.

The memory 84 is a memory such as a random access memory (RAM) or a read only memory (ROM). The storage 85 is a storage unit such as a hard disk, a solid state drive (SSD), or a memory card.

The storage 85 may be a memory such as a RAM or a ROM. The storage 85 may be provided in the computer 80, may be provided outside the computer 80 as long as the computer 80 can assess the storage, and may be connected to the computer 80 in a wired or wireless manner. Alternatively, the storage may be provided to be attachable to and detachable from the computer 80.

The CPU 82 reads the program 90 stored in the storage 85 to the memory 84 and executes the program, and can thus realize the function of each unit of the information processing apparatus of each example embodiment.

The I/O 86 controls input and output of data and a control signal among the computer 80 and other input and output apparatuses. The other input and output apparatuses include, for example, input apparatuses (not illustrated) such as a keyboard, a touch panel, a mouse, and a microphone connected to the computer 80, output apparatuses such as a display, a printer, and a speaker, and an interface among the computer 80 and the input and output apparatuses. The I/O 86 may control input and output of data with other reading or writing apparatuses (not illustrated) for a storage medium.

The communication I/F 87 is a network connection interface performing communication between the computer 80 and an external apparatus. The communication I/F 87 may be a network interface for connection to a cable line, and may be a network interface for connection to a radio line. For example, the computer 80 realizing the information processing apparatus is connected to at least one camera 10 through a network by using the communication I/F 87.

Each constituent element of the information processing apparatus of each example embodiment is realized by any combination of hardware and software of the computer 80 in FIG. 13. It is understood by a person skilled in the art that there are various modification examples in a realization method and a realization apparatus. The functional block diagram illustrating the information processing apparatus of each of the above-described example embodiments indicates a block in the logical functional unit instead of a configuration in the hardware unit.

The information processing apparatus may be configured with a plurality of computers 80, and may be realized by a virtual server. The computer 80 may be provided in a surveillance target location (for example, in a facility) using the present system, and may be provided in the form of cloud computing. A camera in a facility may be connected to a network, and may transmit a captured image to the computer 80 configuring a server on a cloud. The computer 80 in a facility and the computer 80 on a cloud may be combined with each other, and each function of the unit of the information processing apparatus may be distributed to both of the computers so as to be executed.

The computer 80 performing an image analysis process may be selected from the computer 80 in a facility and the computer 80 on a cloud depending on situations. For example, there may be a configuration in which an authentication process is performed by the computer 80 at normal times, and an authentication process is performed by the computer 80 on the cloud in a case where a highly accurate analysis process is desired to be performed.

As mentioned above, the example embodiments of this disclosure have been described with reference to the drawings, but these are examples of this disclosure, and various configurations other than the description may be employed.

For example, the information processing apparatus further may include a specific person feature information database storing feature information of a specific person, and the collation unit 102 may perform a collation process on a person for whom a match is not indicated in a collation process using face feature information stored in the first storage unit 111, by using the specific person feature information database.

For example, the first storage unit 111 may store face feature information of an employee, and the specific person feature information database may store face feature information of a specific person who is desired to be specially found, such as a very important person (VIP), or a person on a blacklist as a person with a criminal record or a marked person. After authentication is performed on employees, a collation process with specific person feature information is performed on a person who is not authenticated, and thus a specific person may be detected. In a case where a specific person is detected, the output unit 120 may output information regarding the specific person.

In a case where there are matches of a predetermined number or more in a collation process with the first registered feature information (face registered feature information) or the second registered feature information (registered person region feature information), the collation unit 102 may regard that a collation result indicates a match. The predetermined number may be set on feature information basis. The information processing apparatus 100 may display a menu screen for receiving setting of the predetermined number, and may set the predetermined number by receiving an operation from an operator.

EXAMPLES

Example 1

In the present example, a description will be made of an example of finding a person which is not authenticated in a predetermined area for a predetermined time or more or by a predetermined time point. The present example is an example using the configuration of the information processing apparatus 100 of the first example embodiment.

FIGS. 14A to 14D are diagrams each illustrating an example of a screen in which an image from the camera 10 imaging a predetermined area is displayed on a display (not illustrated) of the computer 80. FIGS. 15A to 15C are diagrams illustrating a change in data stored in the second storage unit 112. It should be noted that FIGS. 15A to 15C respectively schematically illustrate data contents, and, for example, person region feature information corresponding to a person region of the person C is written as "C" in the item of "person detection".

Figure 14A:
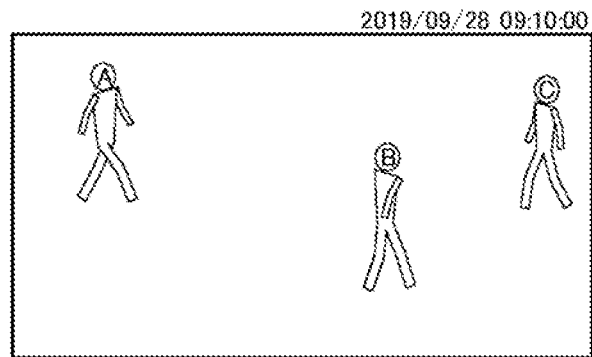
FIGS. 14A to 14D are diagrams each illustrating examples of display screens of images obtained by a camera imaging a predetermined area.

FIG. 14A illustrates an image screen at a first time point (9:10). It is assumed that person regions of three persons such as the person A, the person B, and the person C are detected by the collation unit 102. It is assumed that, with respect to the person A and the person B, matching face feature information is found, and thus authentication thereof is completed by the collation unit 102 through a collation process with face feature information stored in the first storage unit 111, but, with respect to the person C, matching face feature information is not found, and thus authentication thereof is not completed.

An example of information stored in the second storage unit 112 at this time is illustrated in FIG. 15A. In the example illustrated in FIG. 15A, the second storage unit 112 stores person region feature information of a person region of which a face is not authenticated, and capturing date-and-time information of an image from which the person region feature information is extracted. Herein, person region feature information of the person C of which the face is not authenticated is stored.

Figure 14B:
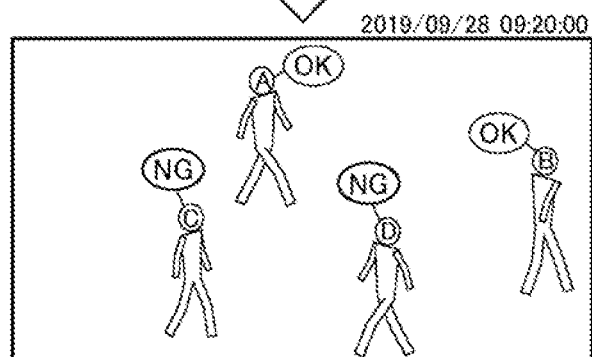

Next, FIG. 14B illustrates an image screen at a second time point (9:20), later than the first time point. With respect to the person A and the person B on whom a collation process is completed by the collation unit 102 and who are thus authenticated, the "OK" mark is displayed in an overlapping manner in association with the person regions on the screen by the output unit 120. With respect to the person C and a person D who cannot be authenticated, the "NG" mark is displayed in an overlapping manner in association with the person regions on the screen by the output unit 120.

The second storage unit 112 in FIG. 15B further stores person region feature information (D) of a person region of the newly detected person D.

Figure 14C:
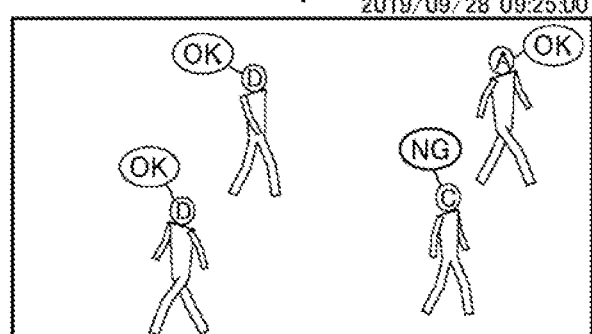

FIG. 14C illustrates an image screen at a third time point (9:25), later than the second time point. Since the face of the person D has been authenticated by the collation unit 102, with respect to the person D, the "OK" mark is displayed in an overlapping manner in association with the person region on the screen by the output unit 120. Since a face of the person C cannot be authenticated by the collation unit 102, with respect to the person C, the "NG" mark is displayed in an overlapping manner in association with the person region on the screen by the output unit 120. Since the face of the person D has been authenticated, as illustrated in FIG. 15C, the record of the person region feature information corresponding to the person region of the person D is deleted from the second storage unit 112 by the deletion unit (not illustrated).

Figure 14D:
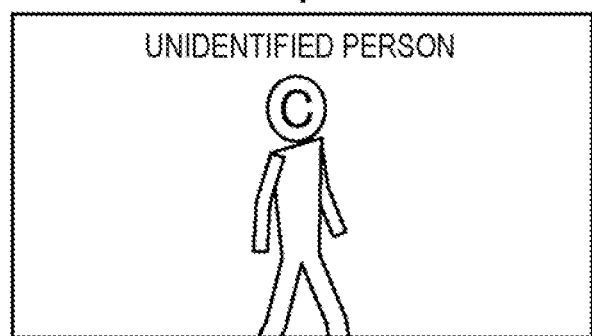

Since only the person region feature information of the person D remains in the second storage unit 112 at a fourth time point (10:00) after a predetermined time elapses, as illustrated in FIG. 14D, the output unit 120 displays an image in which the person C as an unidentified person is closed up on the display.

FIGS. 16A to 16C are diagrams each illustrating an example of another data structure of the second storage unit 112.

The example each illustrated in FIGS. 16A to 16C is an example using the configuration of the information processing apparatus 100 of the fourth example embodiment.

The second storage unit 112 each illustrated in FIGS. 16A to 16C stores person region feature information, capturing date-and-time information of an image from which the person region feature information is extracted, a result of face authentication in a person region corresponding to the person region feature information (in a case where a face has been authenticated, "completed", and, in a case where a face cannot be authenticated, "uncompleted"), and date-and-time information at which a collation process is performed in a case where a face is authenticated. It should be noted that FIGS. 16A to 16C each schematically illustrates "completed" and "uncompleted" for face authentication, but, actually, a flag may be set.

In the example illustrated in FIGS. 16A to 16C, at the fourth time point (10:00) after a predetermined time elapses, information regarding person region feature information (C) of the person C for which a result of face authentication indicates "uncompleted" in the second storage unit 112 is output. Herein, as illustrated in FIG. 14D, the output unit 120 displays an image in which the person C as an unidentified person is closed up on the display.

Example 2

In the present example, a description will be made of an example of finding a person who cannot be authenticated at least from entry into a path through an entrance to exit from the path through an exit by using a plurality of cameras provided along the path. The present example is an example using the configuration of the information processing apparatus 100 of the sixth example embodiment.

Figure 17A:
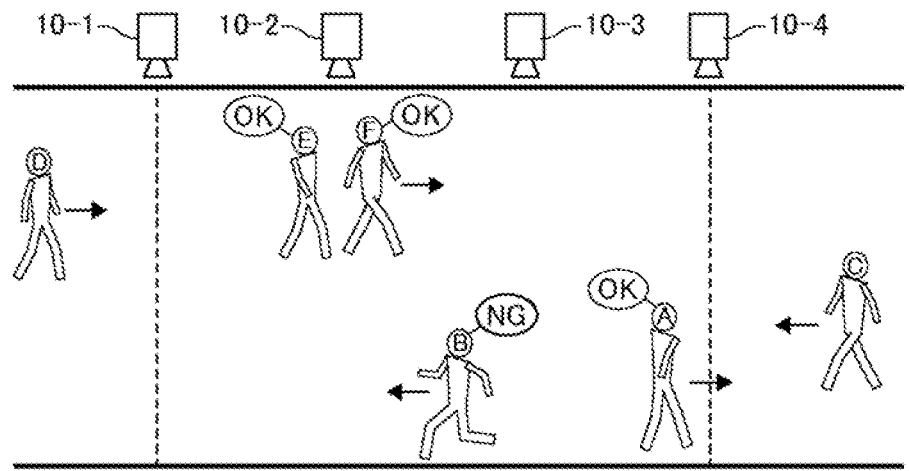
FIGS. 17A to 17C are diagrams each schematically illustrating a situation of a place where four cameras are provided along a certain passage.
Figure 17B:
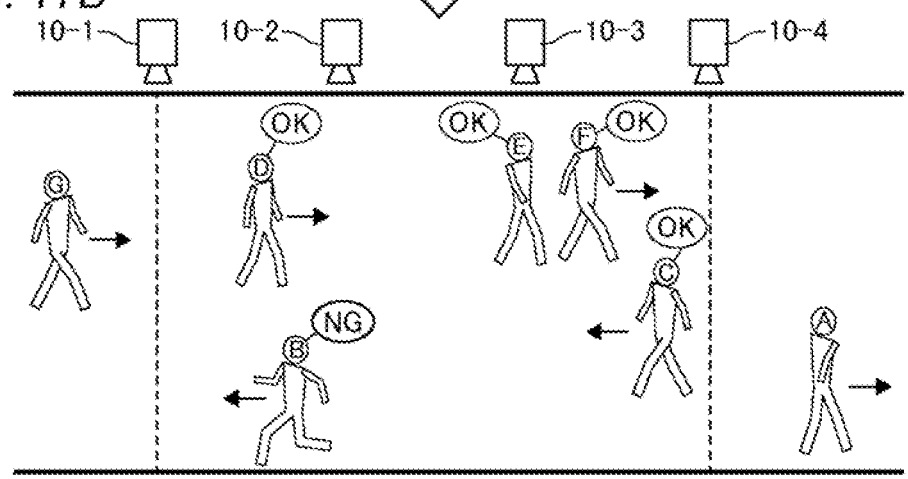
Figure 17C:
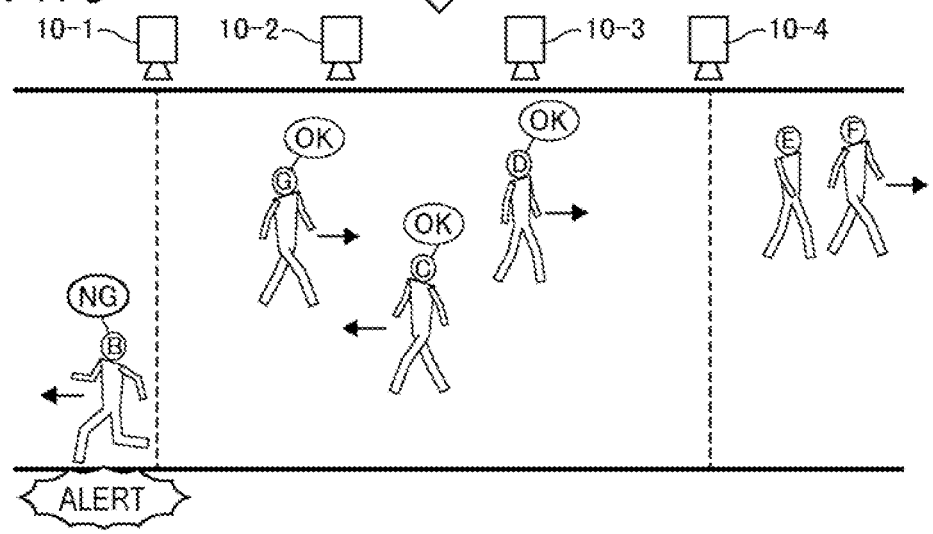

FIGS. 17A to 17C are diagrams each schematically illustrating a situation of a place where four cameras (10-1 to 10-4) are provided along a certain passage. The camera 10-1 and the camera 10-4 are provided at both ends of the path. In the middle of the passage, the camera 10-2 is provided nearer to the camera 10-1, and the camera 10-3 is provided nearer to the camera 10-4.

A plurality of persons A to F are walking along the passage. An arrow added to each person indicates an advancing direction of the person. It is assumed that gates (not illustrated) through which a person enters and exits the passage are provided at the positions of the camera 10-1 and the camera 10-4.

States after times elapse are illustrated in FIGS. 17A, 17B, and 17C in this order. For example, the person D enters the passage through the entrance at the time point in FIG. 17A, and is passing in front of the camera 10-2 at the time point in FIG. 17B. The person D is passing in front of the camera 10-3 at the time point in FIG. 17C. Face authentication of the person D is completed immediately after the person D enters the passage.

In FIGS. 17A to 17C, a person with the "OK" mark indicates a person of which face authentication is completed, and a person with the "NG" mark indicates a person of which a face cannot be authenticated. As in FIGS. 17A to 17C, the output unit 120 may combine images captured by the respective cameras with each other, and may display a mark indicating a result of face authentication in an overlapping manner. Alternatively, a mark indicating a result of face authentication may be displayed to overlap an image from each camera.

Figures 18A, 18B, 18C:
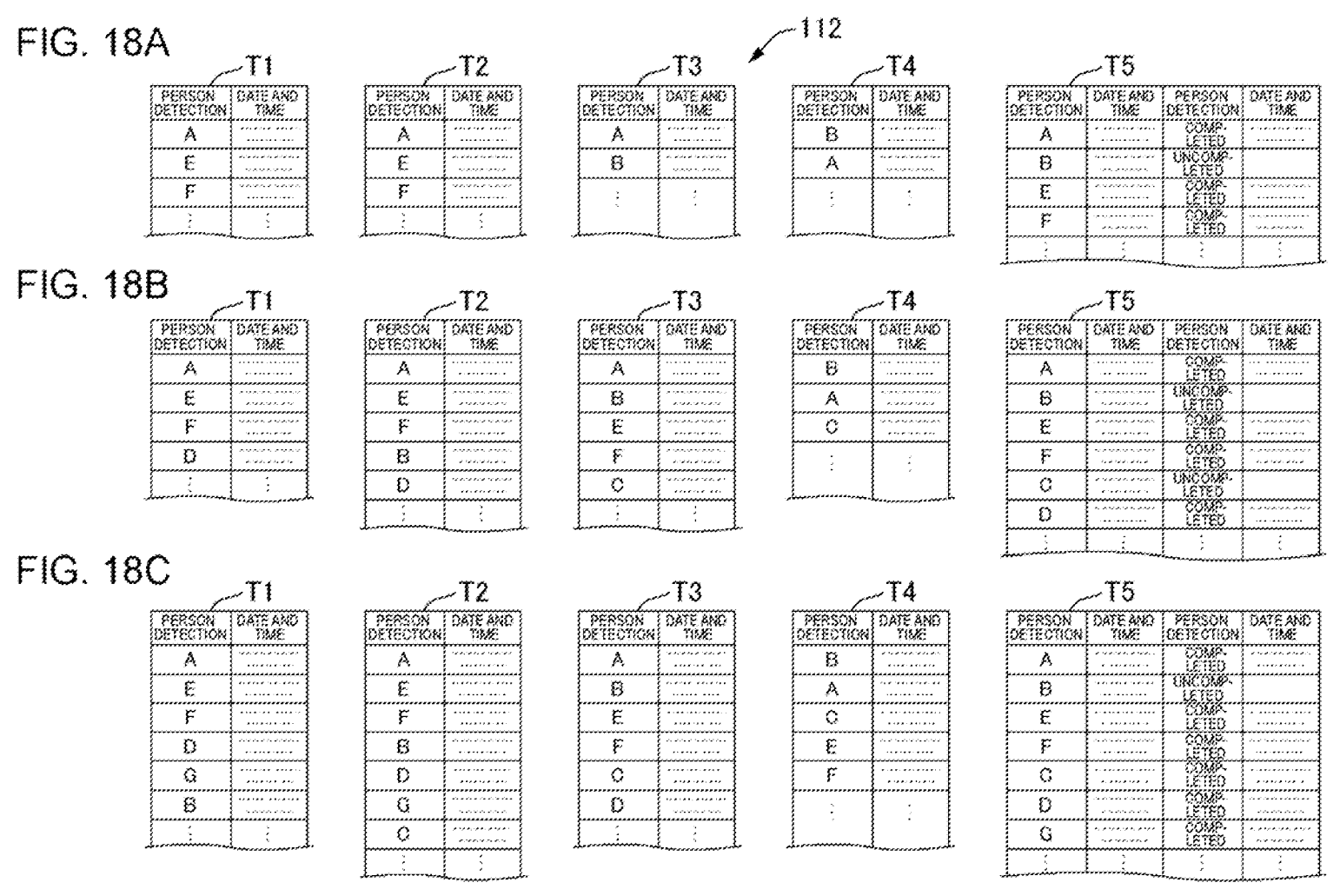

FIGS. 18A to 18C are diagrams illustrating a change in data stored in the second storage unit 112. In the present example embodiment, the second storage unit 112 includes a plurality of tables. The second storage unit includes four tables T1 to T4 in which person region feature information detected in an image captured by each camera and detection date-and-time information are stored, and a table T5 in which pieces of person region feature information detected by the respective cameras are integrated with each other, and a face authentication result in the collation unit 102 and the authentication date and time are stored for each person region of the person region feature information.

States in which times elapse are illustrated in FIGS. 18A, 18B, and 18C in this order.

For example, the person B is passing in front of the camera 10-3 at the time point in FIG. 18A, and person region feature information is detected in images from the camera 10-4 and the camera 10-3 so as to be stored in the table T4 and the table T3. Information indicating that a face cannot be authenticated by the collation unit 102 is stored in the table T5.

The person B is passing in front of the camera 10-2 at the time point in FIG. 18B, and person region feature information is also detected in an image from the camera 10-2 so as to be stored in the table T2. Information indicating that the face cannot be authenticated by the collation unit 102 is stored in the table T5.

For example, the person B is passing in front of the camera 10-1 at the time point in FIG. 18C, and person region feature information is detected in an image from the camera 10-1 so as to be stored in the table T1. Information indicating that the face cannot be authenticated by the collation unit 102 is stored in the table T5. Therefore, the face of the person B is not authenticated in the image captured by the last camera of the path, and thus the output unit 120 outputs an alert for the person B.

Example 3

In the present example, an image captured by a surveillance camera in an airport is used. The registration unit 104 stores person region feature information of a person in the airport in the second storage unit 112.

The camera acquires passport information and images a face of a person during check-in, and the registration unit 104 stores face feature information of the person who has checked in in the first storage unit 111 of the storage unit 110 in association with the passport information.

The collation unit 102 performs a face authentication process while tracking a person by using registered person region feature information in an image captured by each camera in the airport. A person for whom collation does not succeed for a reference time or more is specified, and the output unit 120 outputs an alert. Here, the person for whom collation does not succeed for a reference time or more is a marked person who does not check in and is hanging around the airport.

Among persons who have checked in and of which face feature information is stored in the first storage unit 111 of the storage unit 110, a person having passed security inspection is excluded from a collation target. Specifically, face data is deleted from the first storage unit 111. Alternatively, a flag is added to face feature information in the first storage unit 111, and the person is excluded from a collation target.

As mentioned above, this disclosure has been described with reference to the example embodiments and the Examples, but this disclosure is not limited to the example embodiments and Examples. The configuration or details of this disclosure may be subjected to various changes which can be understood by a person skilled in the art within the scope of this disclosure.

It should be noted that acquisition and use of information regarding a user in this disclosure are assumed to be performed legally.

Some or all of the above-described example embodiments may be disclosed as in the following appendix, but are not limited thereto.

1. An information processing apparatus including:
   a collation unit that collates first feature information extracted from a person included in a first image with first registered feature information stored in a storage unit; and
   a registration unit that, in a case where the first feature information is unable to be extracted from the person or a collation result in the collation unit indicates a mismatch, stores second feature information extracted from the person in the storage unit as second registered feature information,
   in which the collation unit collates second feature information extracted from a person included in a second image with the second registered feature information stored in the storage unit, and thus specifies the person corresponding to the second registered feature information in the second image.

2. The information processing apparatus according to 1.,
   in which the collation unit collates the first feature information extracted from the person specified in the second image with the first registered feature information stored in the storage unit.

3. An information processing apparatus including:
   a collation unit that collates first feature information extracted from a person included in a first image with first registered feature information stored in a storage unit; and
   a registration unit that stores second feature information extracted from the person in the storage unit as second registered feature information,
   in which the collation unit collates second feature information extracted from a person included in a second image with the second registered feature information stored in the storage unit, and thus specifies the person corresponding to the second registered feature information in the second image, and
   in which, in a case where the first feature information is unable to be extracted from the person included in the first image, or a collation result between the first feature information extracted from the person included in the first image and the first registered feature information indicates a mismatch, the collation unit collates first feature information extracted from the person specified in the second image with the first registered feature information stored in the storage unit.

4. The information processing apparatus according to any one of 1. to 3.,
   in which the collation unit repeatedly performs a process of specifying a person corresponding to the second registered feature information in the second image and a process of collating the first feature information extracted from the specified person with the first registered feature information until the collation result indicates a match.

5. The information processing apparatus according to any one of 1. to 4., further including:
   a deletion unit that, in a case where a collation result between the first feature information extracted from the person and the first registered feature information stored in the storage unit indicates a match, deletes the second registered feature information of the person specified in the second image from the storage unit.

6. The information processing apparatus according to any one of 1. to 5.,
   in which the second image is captured by a camera which is different from a camera capturing the first image.

7. The information processing apparatus according to any one of 1. to 6.,
   in which the first image is captured by a first camera among a plurality of cameras provided along a path, and the second image is captured by a second camera located after the first camera in a direction along the path.

8. The information processing apparatus according to 7., further including:
   an output unit that, in a case where a collation result with the first registered feature information indicates a mismatch with respect to the person specified by the collation unit in the second image generated by the second camera provided last or at a predetermined position in the direction along the path among a plurality of the second cameras, outputs information regarding the second feature information extracted from the person.

9. The information processing apparatus according to any one of 1. to 8.,
   in which the first image is captured at a first timing, and the second image is captured after the first timing.

10. The information processing apparatus according to any one of 1. to 9.,
    in which the registration unit stores information indicating the collation result between the first feature information extracted from the person included in the first image and the first registered feature information in the storage unit in association with the second registered feature information, and
    in which, in a case where the information indicating the collation result indicates a mismatch as the collation result, the collation unit collates the first feature information extracted from the person specified in the second image with the first registered feature information stored in the storage unit.

11. The information processing apparatus according to any one of 1. to 10.,
    in which the registration unit stores information indicating that the first feature information is unable to be extracted from the person included in the first image, in the storage unit in association with the second registered feature information, and
    in which, in a case where the information indicates that the first feature information is unable to be extracted from the person included in the first image, the collation unit collates the first feature information extracted from the person specified in the second image with the first registered feature information stored in the storage unit.

12. The information processing apparatus according to any one of 1. to 11., in which the registration unit stores the second feature information in the storage unit along with time information, the information processing apparatus further including an output unit that, in a case where the first feature information is unable to be extracted from the person specified in the second image or the collation result with the first feature information extracted from the person specified in the second image indicates a mismatch even though a reference time or more elapses from a time point indicated by the time information, outputs information regarding the second feature information.

13. The information processing apparatus according to any one of 1. to 12.,
in which, in a case where matches of a predetermined number or more occur in a collation process with the first registered feature information or the second registered feature information, the collation unit regards that the collation result indicates a match.

14. The information processing apparatus according to any one of 1. to 13.,
in which the first feature information is face feature information, and the second feature information is feature information including a region other than a face.

15. The information processing apparatus according to any one of 1. to 14., further including:
an output unit that outputs information regarding the second registered feature information which is stored in the storage unit at a reference timing.

16. An information processing system including:
a collation unit that collates first feature information extracted from a person included in a first image with first registered feature information stored in a storage unit; and
a registration unit that, in a case where the first feature information is unable to be extracted from the person or a collation result in the collation unit indicates a mismatch, stores second feature information extracted from the person in the storage unit as second registered feature information,
in which the collation unit collates second feature information extracted from a person included in a second image with the second registered feature information stored in the storage unit, and thus specifies the person corresponding to the second registered feature information in the second image.

17. The information processing system according to 16.,
in which the collation unit collates the first feature information extracted from the person specified in the second image with the first registered feature information stored in the storage unit.

18. An information processing system including:
a collation unit that collates first feature information extracted from a person included in a first image with first registered feature information stored in a storage unit; and
a registration unit that stores second feature information extracted from the person in the storage unit as second registered feature information,
in which the collation unit collates second feature information extracted from a person included in a second image with the second registered feature information stored in the storage unit, and thus specifies the person corresponding to the second registered feature information in the second image, and in which, in a case where the first feature information is unable to be extracted from the person included in the first image, or a collation result between the first feature information extracted from the person included in the first image and the first registered feature information indicates a mismatch, the collation unit collates first feature information extracted from the person specified in the second image with the first registered feature information stored in the storage unit.

19. The information processing system according to any one of 16. to 18.,
in which the collation unit repeatedly performs a process of specifying a person corresponding to the second registered feature information in the second image and a process of collating the first feature information extracted from the specified person with the first registered feature information until the collation result indicates a match.

20. The information processing system according to any one of 16. to 19., further including:
a deletion unit that, in a case where a collation result between the first feature information extracted from the person specified in the second image and the first registered feature information stored in the storage unit indicates a match, deletes the second registered feature information of the person from the storage unit.

21. The information processing system according to any one of 16. to 20.,
in which the second image is captured by a camera which is different from a camera capturing the first image.

22. The information processing system according to any one of 16. to 21.,
in which the first image is captured by a first camera among a plurality of cameras provided along a path, and the second image is captured by a second camera located after the first camera in a direction along the path.

23. The information processing system according to 22., further including:
an output unit that, in a case where a collation result with the first registered feature information indicates a mismatch with respect to the person specified by the collation unit in the second image generated by the second camera provided last or at a predetermined position in the direction along the path among a plurality of the second cameras, outputs information regarding the second feature information extracted from the person.

24. The information processing system according to any one of 16. to 23., in which the first image is captured at a first timing, and the second image is captured after the first timing.

25. The information processing system according to any one of 16. to 24.,
in which the registration unit stores information indicating the collation result between the first feature information extracted from the person included in the first image and the first registered feature information in the storage unit in association with the second registered feature information, and
in which, in a case where the information indicating the collation result indicates a mismatch as the collation result, the collation unit collates the first feature information extracted from the person specified in the second image with the first registered feature information stored in the storage unit.

26. The information processing system according to any one of 16. to 25.,
- in which the registration unit stores information indicating that the first feature information is unable to be extracted from the person included in the first image, in the storage unit in association with the second registered feature information, and
- in which, in a case where the information indicates that the first feature information is unable to be extracted from the person included in the first image, the collation unit collates the first feature information extracted from the person specified in the second image with the first registered feature information stored in the storage unit.

27. The information processing system according to any one of 16. to 26.,
- in which the registration unit stores the second feature information in the storage unit along with time information,
- the information processing system further including an output unit that, in a case where the first feature information is unable to be extracted from the person specified in the second image or the collation result with the first feature information extracted from the person specified in the second image indicates a mismatch even though a reference time or more elapses from a time point indicated by the time information, outputs information regarding the second feature information.

28. The information processing system according to any one of 16. to 27.,
- in which, in a case where matches of a predetermined number or more occur in a collation process with the first registered feature information or the second registered feature information, the collation unit regards that the collation result indicates a match.

29. The information processing system according to any one of 16. to 28.,
- in which the first feature information is face feature information, and the second feature information is feature information including a region other than a face.

30. The information processing system according to any one of 16. to 29., further including:
- an output unit that outputs information regarding the second registered feature information which is stored in the storage unit at a reference timing.

31. An information processing method executed by an information processing apparatus, the method including:
- collating first feature information extracted from a person included in a first image with first registered feature information stored in a storage unit;
- in the storage unit as second registered feature information in a case where the first feature information is unable to be extracted from the person or a collation result indicates a mismatch, storing second feature information extracted from the person; and
- collating second feature information extracted from a person included in a second image with the second registered feature information stored in the storage unit, and thus specifying the person corresponding to the second registered feature information in the second image.

32. The information processing method executed by an information processing apparatus according to 31., the method comprising:
- collating the first feature information extracted from the person specified in the second image with the first registered feature information stored in the storage unit.

33. An information processing method executed by an information processing apparatus, the method including:
- collating first feature information extracted from a person included in a first image with first registered feature information stored in a storage unit;
- storing second feature information extracted from the person in the storage unit as second registered feature information;
- collating second feature information extracted from a person included in a second image with the second registered feature information stored in the storage unit, and thus specifying the person corresponding to the second registered feature information in the second image; and
- in a case where the first feature information is unable to be extracted from the person included in the first image, or a collation result between the first feature information extracted from the person included in the first image and the first registered feature information indicates a mismatch, collating first feature information extracted from the person specified in the second image with the first registered feature information stored in the storage unit.

34. The information processing method executed by an information processing apparatus according to any one of 31. to 33., the method comprising:
- repeatedly performing a process of specifying a person corresponding to the second registered feature information in the second image and a process of collating the first feature information extracted from the specified person with the first registered feature information until the collation result indicates a match.

35. The information processing method executed by an information processing apparatus according to any one of 31. to 34., the method further including:
- in a case where a collation result between the first feature information extracted from the person specified in the second image and the first registered feature information stored in the storage unit indicates a match, deleting the second registered feature information of the person from the storage unit.

36. The information processing method according to any one of 31. to 35.,
- in which the second image is captured by a camera which is different from a camera capturing the first image.

37. The information processing method according to any one of 31. to 36.,
- in which the first image is captured by a first camera among a plurality of cameras provided along a path, and the second image is captured by a second camera located after the first camera in a direction along the path.

38. The information processing method executed by an information processing apparatus according to 37., the method comprising:
- in a case where a collation result with the first registered feature information indicates a mismatch with respect to the person specified in the second image generated by the second camera provided last or at a predetermined position in the direction along the path among a plurality of second cameras, outputting information regarding the second feature information extracted from the person.

39. The information processing method according to any one of 31. to 38.,
in which the first image is captured at a first timing, and the second image is captured after the first timing.

40. The information processing method executed by an information processing apparatus according to any one of 31. to 39., the method comprising:
storing information indicating the collation result between the first feature information extracted from the person included in the first image and the first registered feature information in the storage unit in association with the second registered feature information; and
collating the first feature information extracted from the person specified in the second image with the first registered feature information stored in the storage unit in a case where the information indicating the collation result indicates a mismatch as the collation result.

41. The information processing method executed by an information processing apparatus according to any one of 31. to 40., the method comprising:
storing information indicating that the first feature information is unable to be extracted from the person included in the first image, in the storage unit in association with the second registered feature information; and
collating the first feature information extracted from the person specified in the second image with the first registered feature information stored in the storage unit in a case where the information indicates that the first feature information is unable to be extracted from the person included in the first image.

42. The information processing method executed by an information processing apparatus according to any one of 31. to 41., the method further including:
storing the second feature information in the storage unit along with time information; and
in a case where the first feature information is unable to be extracted from the person specified in the second image or the collation result with the first feature information extracted from the person specified in the second image indicates a mismatch even though a reference time or more elapses from a time point indicated by the time information, outputting information regarding the second feature information.

43. The information processing method executed by an information processing apparatus according to any one of 31. to 42., the method comprising:
in a case where matches of a predetermined number or more occur in a collation process with the first registered feature information or the second registered feature information, regarding that the collation result indicates a match.

44. The information processing method according to any one of 31. to 43., in which the first feature information is face feature information, and the second feature information is feature information including a region other than a face.

45. The information processing method executed by an information processing apparatus according to any one of 31. to 44., the method further including:
outputting information regarding the second registered feature information which is stored in the storage unit at a reference timing.

46. A program causing a computer to execute:
a procedure of collating first feature information extracted from a person included in a first image with first registered feature information stored in a storage unit;
a procedure of storing, in a case where the first feature information is unable to be extracted from the person or a collation result in the collation procedure indicates a mismatch, second feature information extracted from the person in the storage unit as second registered feature information; and
a procedure of collating second feature information extracted from a person included in a second image with the second registered feature information stored in the storage unit, and thus specifying the person corresponding to the second registered feature information in the second image.

47. The program according to 46., causing the computer to execute:
a procedure of collating the first feature information extracted from the person specified in the second image with the first registered feature information stored in the storage unit.

48. A program causing a computer to execute:
a procedure of collating first feature information extracted from a person included in a first image with first registered feature information stored in a storage unit;
a procedure of storing second feature information extracted from the person in the storage unit as second registered feature information;
a procedure of collating second feature information extracted from a person included in a second image with the second registered feature information stored in the storage unit, and thus specifying a person corresponding to the second registered feature information in the second image; and
a procedure of collating, in a case where the first feature information is unable to be extracted from the person included in the first image, or a collation result between the first feature information extracted from the person included in the first image and the first registered feature information indicates a mismatch, first feature information extracted from the person specified in the second image with the first registered feature information stored in the storage unit.

49. The program according to any one of 46. to 48., causing the computer to execute:
a procedure of repeatedly performing a process of specifying a person corresponding to the second registered feature information in the second image and a process of collating the first feature information extracted from the specified person with the first registered feature information until the collation result indicates a match.

50. The program according to any one of 46. to 49., causing the computer to further execute:
a procedure of deleting, in a case where a collation result between the first feature information extracted from the person specified in the second image and the first registered feature information stored in the storage unit indicates a match, the second registered feature information of the person from the storage unit.

51. The program according to any one of 46. to 50.,
in which the second image is captured by a camera which is different from a camera capturing the first image.

52. The program according to any one of 46. to 51., in which the first image is captured by a first camera among a plurality of cameras provided along a path, and the second image is captured by a second camera located after the first camera in a direction along the path.

53. The program according to 52., causing the computer to execute:

a procedure of outputting, in a case where a collation result with the first registered feature information indicates a mismatch with respect to the person specified in the second image generated by the second camera provided last or at a predetermined position in the direction along the path among a plurality of the second cameras, information regarding the second feature information extracted from the person.

54. The program according to any one of 46. to 53., in which the first image is captured at a first timing, and the second image is captured after the first timing.

55. The program according to any one of 46. to 54., causing the computer to execute:
a procedure of storing information indicating the collation result between the first feature information extracted from the person included in the first image and the first registered feature information in the storage unit in association with the second registered feature information, and
a procedure of collating the first feature information extracted from the person specified in the second image with the first registered feature information stored in the storage unit in a case where the information indicating the collation result indicates a mismatch as the collation result.

56. The program according to any one of 46. to 55., causing the computer to execute:
a procedure of storing information indicating that the first feature information is unable to be extracted from the person included in the first image, in the storage unit in association with the second registered feature information, and
a procedure of collating the first feature information extracted from the person specified in the second image with the first registered feature information stored in the storage unit in a case where the information indicates that the first feature information is unable to be extracted from the person included in the first image.

57. The program according to any one of 46. to 56., causing the computer to further execute:
a procedure of storing the second feature information in the storage unit along with time information; and
a procedure of outputting, in a case where the first feature information is unable to be extracted from the person specified in the second image or the collation result with the first feature information extracted from the person specified in the second image indicates a mismatch even though a reference time or more elapses from a time point indicated by the time information, information regarding the second feature information.

58. The program according to any one of 46. to 57., in which, in a case where matches of a predetermined number or more occur in a collation process with the first registered feature information or the second registered feature information, the computer executes a procedure of regarding that the collation result indicates a match.

59. The program according to any one of 46. to 58., in which the first feature information is face feature information, and the second feature information is feature information including a region other than a face.

60. The program according to any one of 46. to 59., causing the computer to further execute:
a procedure of outputting information regarding the second registered feature information which is stored in the storage unit at a reference timing.

61. An information processing apparatus processing an image generated by each of a plurality of cameras provided along a path, comprising:
a collation unit that collates first feature information extracted from a person included in a first image captured by a first camera among the plurality of cameras, with first registered feature information stored in a storage unit; and
a registration unit that stores second feature information extracted from the person in the storage unit as second registered feature information in a case where the first feature information is unable to be extracted from the person or a collation result in the collation unit indicates a mismatch,
in which the collation unit collates the second feature information extracted from a person included in a second image captured by a second camera located after the first camera in a direction along the path, with the second registered feature information stored in the storage unit, and thus specifies a person corresponding to the second registered feature information in the second image.

62. An information processing apparatus processing an image generated by each of a plurality of cameras provided along a path, comprising:
a collation unit that collates first feature information extracted from a person included in a first image captured by a first camera among the plurality of cameras, with first registered feature information stored in a storage unit; and
a registration unit that stores second feature information extracted from the person in the storage unit,
in which the collation unit collates second feature information extracted from a person included in a second image captured by a second camera located after the first camera in a direction along the path, with second registered feature information stored in the storage unit, and thus specifies the person in the second image, and
in which, in a case where the first feature information is unable to be extracted from the person included in the first image, or a collation result with the first feature information extracted from the person included in the first image indicates a mismatch, the collation unit collates the first feature information extracted from the person in the second image with the first registered feature information stored in the storage unit.

The invention claimed is:

1. An information processing apparatus comprising:
at least one memory configured to store instructions; and
at least one processor configured to execute the instructions to:
perform a first collation process of collating first feature information extracted from a person included in a first image with first registered feature information stored in a first storage unit, to acquire a first collation result;
in a case where the first feature information is not extracted from the person included in the first image or the first collation result indicates a mismatch, store second feature information extracted from the person as second registered feature information in a second storage unit;
perform a second collation process of collating second feature information extracted from a person included in a second image with the second registered feature information stored in the second storage unit, to acquire a second collation result and determine, from the second image, a person corresponding to the second registered feature information;

repeatedly perform, within a predetermined time or during a period till until a predetermined time point, the first and second collation processes with respect to a plurality of the second images repeatedly captured in a predetermined area;

store information indicating the first collation result with respect to the first feature information of the person corresponding to the second registered feature information in association with the second registered feature information in the second storage unit;

in a case where the first feature information is not extracted from the person included in the first image or the first collation result indicates the mismatch, perform a third collation process of collating first feature information extracted from the person determined from the second image with the first registered feature information stored in the first storage unit, to acquire a third collation result; and after performing the third collation process, update, in the second storage unit, the information indicating the first collation result associated with the second registered feature of the person corresponding to the first feature information of the person for using the first collation process, with using the third collation result, wherein the first image is captured by a first camera among a plurality of cameras provided along a path, and the second image is captured by a second camera located after the first camera in a direction along the path, and the at least one processor is configured to execute the instructions to further:

store the second feature information as the second registered feature information in the second storage unit in association with information indicating the first collation result of the person;

in a case where the third collation result indicates a match, update, in the second storage unit, the information indicating the first collation result associated with the second registered feature of the person with using the third collation result; and determine a person with respect to which the third collation process indicates a mismatch through between a start point of the path and an end point of the path.

2. The information processing apparatus according to claim 1, wherein the at least one processor is configured to execute the instructions to in case where the first collation result indicates a match, delete, from the second storage unit, the second registered feature information of the person corresponding to the person of whom the first feature information is used to perform the first collation process.

3. The information processing apparatus according to claim 1, wherein the at least one processor is configured to execute the instructions to perform the first and second collation processes with respect to a plurality of persons included in the first and second images.

4. The information processing apparatus according to claim 1, wherein the at least one processor is configured to execute the instructions to output information regarding the second registered feature information of the determined person.

5. The information processing apparatus according to claim 1, wherein the at least one processor is configured to execute the instructions to output an alert for the determined person.

6. The information processing apparatus according to claim 1, wherein the at least one processor is configured to execute the instructions to in a case where the person is determined with respect to which the third collation process indicates a mismatch between the start point of the path and the end point of the path, output at least a control signal of a locking or unlocking control signal to a locking apparatus of an entrance door in the predetermined area, and an opening or closing control signal to a drive apparatus of at least one of a gate, an automatic door, and a shutter.

7. The information processing apparatus according to claim 1, wherein the at least one processor is configured to execute the instructions to:

in a case where the second feature information extracted from the second image is not stored in the second storage unit after performing the second collation process, perform the first collation process with respect to the first feature information extracted from the person; and store the second feature information extracted from the person as the second registered feature information in the second storage unit in association with information indicating the first collation result of the person.

8. The information processing apparatus according to claim 1, wherein the at least one processor is configured to execute the instructions to store the second feature information of the person extracted in the second collation process, as a new second registered feature information, in the second storage unit in association with the second registered feature information.

9. The information processing apparatus according to claim 1, wherein the at least one processor is configured to execute the instructions to overwrite the second registered feature information with the second feature information of the person extracted in the second collation process in the second storage unit.

10. The information processing apparatus according to claim 1, wherein the at least one processor is configured to execute the instructions to in a case where the third collation result with respect to the determined person from the second image generated by the second camera provided last or at a predetermined position in the direction along the path among a plurality of the second cameras indicates a mismatch, output information regarding the second feature information extracted from the person.

11. The information processing apparatus according to claim 1, wherein the at least one processor is configured to execute the
instructions to:
store information indicating that the first feature information is unable to be extracted from the person included in the first image, in the second storage unit in association with the second registered feature information; and
in a case where the information indicates that the first feature information is unable to be extracted from the person included in the first image, perform the third collation process with respect to the second image.

12. The information processing apparatus according to claim 1, wherein
the at least one processor is configured to execute the instructions to:
store the second feature information in the second storage unit in association with time information; and
in a case where the first feature information is unable to be extracted from the determined person from the second image or the third collation result indicates a mismatch even though a reference time or more elapses from a time point indicated by the time information, output information regarding the second feature information.

13. The information processing apparatus according to claim 1, wherein
the at least one processor is configured to execute the instructions to:
in a case where matches of a predetermined number or more occur in the first, second and third collation processes, respectively, regard that the first, second and third collation results indicate matches, respectively.

14. The information processing apparatus according to claim 1, wherein
the first feature information is face feature information, and the second feature information is feature information including a region other than a face.

15. The information processing apparatus according to claim 1, wherein
the at least one processor is configured to execute the instructions to:
output information regarding the second registered feature information which is stored in the second storage unit at a reference timing.

16. An information processing method executed by an information processing apparatus, the method comprising:
performing a first collation process of collating first feature information extracted from a person included in a first image with first registered feature information stored in a first storage unit, to acquire a first collation result;
in a case where the first feature information is not extracted from the person included in the first image or the first collation result indicates a mismatch, storing second feature information extracted from the person as second registered feature information in a second storage unit;
performing a second collation process of collating second feature information extracted from a person included in a second image with the second registered feature information stored in the second storage unit, to acquire a second collation result and determine, from the second image, a person corresponding to the second registered feature information;
repeatedly performing, within a predetermined time or during a period until a predetermined time point, the first and second collation processes with respect to a plurality of the second images repeatedly captured in a predetermined area;
storing information indicating the first collation result with respect to the first feature information of the person corresponding to the second registered feature information in association with the second registered feature information in the second storage unit;
in a case where the first feature information is not extracted from the person included in the first image or the first collation result indicates the mismatch, performing a third collation process of collating first feature information extracted from the person determined from the second image with the first registered feature information stored in the first storage unit, to acquire a third collation result; and
after performing the third collation process, updating, in the second storage unit, the information indicating the first collation result associated with the second registered feature of the person corresponding to the first feature information of the person for using the first collation process, with using the third collation result, wherein
the first image is captured by a first camera among a plurality of cameras provided along a path, and the second image is captured by a second camera located after the first camera in a direction along the path, and
the method further comprises:
storing the second feature information as the second registered feature information in the second storage unit in association with information indicating the first collation result of the person;
in a case where the third collation result indicates a match, updating, in the second storage unit, the information indicating the first collation result associated with the second registered feature of the person with using the third collation result; and
determining a person with respect to which the third collation process indicates a mismatch through between a start point of the path and an end point of the path.

17. A non-transitory computer-readable storage medium storing a program executable by a computer to perform processing comprising:
performing a first collation process of collating first feature information extracted from a person included in a first image with first registered feature information stored in a first storage unit, to acquire a first collation result;
in a case where the first feature information is not extracted from the person included in the first image or the first collation result indicates a mismatch, storing second feature information extracted from the person as second registered feature information in a second storage unit;
performing a second collation process of collating second feature information extracted from a person included in a second image with the second registered feature information stored in the second storage unit, to acquire a second collation result and determine, from the second image, a person corresponding to the second registered feature information;
repeatedly performing, within a predetermined time or during a period till a predetermined time point, the first and second collation processes with respect to a plurality of the second images repeatedly captured in a predetermined area;

storing information indicating the first collation result with respect to the first feature information of the person corresponding to the second registered feature information in association with the second registered feature information in the second storage unit;

in a case where the first feature information is not extracted from the person included in the first image or the first collation result indicates the mismatch, performing a third collation process of collating first feature information extracted from the person determined from the second image with the first registered feature information stored in the first storage unit, to acquire a third collation result; and after performing the third collation process, updating, in the second storage unit, the information indicating the first collation result associated with the second registered feature of the person corresponding to the first feature information of the person for using the first collation process, with using the third collation result, wherein the first image is captured by a first camera among a plurality of cameras provided along a path, and the second image is captured by a second camera located after the first camera in a direction along the path, and the processing further comprises:
storing the second feature information as the second registered feature information in the second storage unit in association with information indicating the first collation result of the person;

in a case where the third collation result indicates a match, updating, in the second storage unit, the information indicating the first collation result associated with the second registered feature of the person with using the third collation result; and determining a person with respect to which the third collation process indicates a mismatch through between a start point of the path and an end point of the path.

* * * * *